(12) United States Patent
Harada

(10) Patent No.: US 7,986,261 B2
(45) Date of Patent: Jul. 26, 2011

(54) COLLISION PREDICTION SYSTEM AND COLLISION PREDICTING METHOD

(75) Inventor: Tomoaki Harada, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 31 days.

(21) Appl. No.: 12/685,168

(22) Filed: Jan. 11, 2010

(65) Prior Publication Data

US 2010/0214155 A1    Aug. 26, 2010

(30) Foreign Application Priority Data

Feb. 25, 2009    (JP) .................................. 2009-041904

(51) Int. Cl.
*G01S 13/58*    (2006.01)

(52) U.S. Cl. ......... 342/107; 342/104; 342/118; 342/147

(58) Field of Classification Search .................. 342/104, 342/107, 118, 147
See application file for complete search history.

(56) References Cited

U.S. PATENT DOCUMENTS

| | | | |
|---|---|---|---|
| 2004/0117091 A1* | 6/2004 | Prakah-Asante et al. | 701/45 |
| 2009/0143951 A1* | 6/2009 | Takahashi et al. | 701/70 |
| 2009/0299576 A1* | 12/2009 | Baumann et al. | 701/45 |
| 2010/0169015 A1 | 7/2010 | Tsunekawa et al. | |

FOREIGN PATENT DOCUMENTS

| | | |
|---|---|---|
| DE | 102 47 670 A1 | 4/2003 |
| DE | 10 2004 006 196 A1 | 8/2005 |
| DE | 10 2004 045 838 A1 | 11/2005 |
| JP | 2000-206241 | 7/2000 |
| JP | 2004-295620 | 10/2004 |
| JP | 2007-210563 | 8/2007 |
| JP | 2008-213535 | 9/2008 |
| JP | 2008-267826 | 11/2008 |
| JP | 2010-156567 | 7/2010 |

OTHER PUBLICATIONS

Office Action issued Nov. 15, 2010, in German Patent Application No. 10 2010 002 307.8-21 (with English translation).
Office Action issued on Dec. 21, 2010, in Japanese Patent Application No. 2009-041904 (with Partial English Translation).

* cited by examiner

*Primary Examiner* — Thomas H Tarcza
*Assistant Examiner* — Timothy A Brainard
(74) *Attorney, Agent, or Firm* — Oblon, Spivak, McClelland, Maier & Neustadt, L.L.P.

(57) ABSTRACT

A collision prediction system includes a collision face determining unit that determines a collision face of the own vehicle which is presumed to collide with another vehicle, based on a travelling direction of the other vehicle relative to the own vehicle at an estimated collision time at which a collision is presumed to occur, a collision position estimating unit that estimates a collision position as a position of a potential collision between the own vehicle and the other vehicle, based on the collision face determined by the collision face determining unit, and a collision position correcting unit that corrects the collision position estimated by the collision position estimating unit, based on a preset size of the other vehicle.

20 Claims, 19 Drawing Sheets

COLLISION PREDICTION SYSTEM AND COLLISION PREDICTING METHOD

INCORPORATION BY REFERENCE

The disclosure of Japanese Patent Application No. 2009-041904 filed on Feb. 25, 2009 including the specification, drawings and abstract is incorporated herein by reference in its entirety.

BACKGROUND OF THE INVENTION

1. Field of the Invention

The invention relates to a collision prediction system installed on an own vehicle for predicting a collision of the own vehicle with an object detected via a radar device, and a collision predicting method implemented by the collision prediction system. More particularly, the invention relates to such collision prediction system and collision predicting method for estimating a collision position of the own vehicle at which the own vehicle is presumed to collide with another vehicle as an example of the object.

2. Description of the Related Art

Occupant protection devices, such as a seat belt, for protecting occupants in the event of a collision of a vehicle with an object are known. To meet a need to estimate a collision position of the vehicle so as to enable the occupant protection devices to appropriately protect the occupants, some systems and methods for estimating the collision position of the vehicle have been proposed (see, for example, Japanese Patent Application Publication No. 2008-213535 (JP-A-2008-213535)). A collision prediction system as described in JP-A-2008-213535 calculates the collision position in the manner as described below.

When the own vehicle is presumed to collide with another vehicle (which will be called "target vehicle"), a collision face determining unit initially selects a face of the own vehicle with which the target vehicle is presumed to collide. A vehicle trajectory intersection calculating unit calculates an intersection point of the own vehicle and the target vehicle, and a collision predicting unit determines whether a collision of the own vehicle and the target vehicle will occur, based on the intersection point of the own vehicle and the target vehicle and the lengths of time it takes for the own vehicle and the target vehicle to reach the intersection point. If it is determined that the own vehicle will collide with the target vehicle, the collision position calculating unit calculates a collision position on the own vehicle at which the own vehicle will collide with the target vehicle, based on the collision face selected by the collision face determining unit. In the collision prediction system as described in JP-A-2008-213535, the collision face of the own vehicle on which the own vehicle will collide with a mobile unit (e.g., another vehicle) is predicted; therefore, the calculation load involved in the estimation of the collision position of the vehicle can be reduced.

In the collision prediction system as described in JP-A-2008-213535, however, it may be difficult in some cases to accurately estimate the collision position of the vehicle. More specifically, the collision prediction system as described in JP-A-2008-213535 determines a collision position at which an acquisition point on the target vehicle which is captured by a radar sensor collides with the own vehicle, as the collision position of the vehicle. If the target vehicle collides at a generally right angle with a side face of the own vehicle, for example, a certain area of (i.e., a part of or the entire area of) the front face of the target vehicle will collide with a certain area of the side face of the own vehicle (see FIG. 4 and FIG. 5A-FIG. 5E). In this case, it would be necessary to take account of the vehicle width of the target vehicle so as to accurately determine the collision position.

SUMMARY OF THE INVENTION

The present invention provides a collision prediction system capable of accurately determining a collision position.

A first aspect of the invention provides a collision prediction system installed on an own vehicle for predicting a collision of the own vehicle with an object detected via a radar device. The collision prediction system includes a collision face determining portion that determines a collision face of the own vehicle which is presumed to collide with the object, based on a travelling direction of the object relative to the own vehicle at an estimated collision time at which a collision is presumed to occur, a collision position estimating portion that estimates a collision position as a position of a potential collision between the own vehicle and the object, based on the collision face determined by the collision face determining portion, and a collision position correcting portion that corrects the collision position estimated by the collision position estimating portion, based on a preset size of the object.

According to the first aspect of the invention, the collision face of the own vehicle which is presumed to collide with the object is determined, based on the travelling direction of the object relative to the own vehicle at the estimated collision time at which the collision is presumed to occur. Also, the collision position of the own vehicle at which the own vehicle will collide with the object is estimated based on the determined collision face. Furthermore, the estimated collision position is corrected based on the preset size of the object. Accordingly, the collision position can be accurately determined.

Since the estimated collision position is corrected based on the preset size of the object, the collision position can be accurately determined. For example, if the object is another vehicle, and the other vehicle is expected to collide at a generally right angle with a side face of the own vehicle, a certain area of (i.e., a part of or the entire area of) the front face of the other vehicle will collide with a certain area of the side face of the own vehicle (see FIG. 4 and FIGS. 5A-5E). In this case, if the collision position is corrected in view of the vehicle width of the other vehicle, the collision position can be accurately determined.

The above-indicated object may be another vehicle, and the collision face determining portion may determine an own-vehicle collision face as the collision face of the own vehicle which is presumed to collide with the other vehicle, while the collision position estimating portion may estimate the collision position of the own vehicle at which the own vehicle is presumed to collide with the other vehicle, based on the own-vehicle collision face determined by the collision face determining portion.

In the above case where the object is another vehicle, the collision position of the own vehicle at which the own vehicle will collide with the other vehicle is estimated, based on the own-vehicle collision face as the collision face of the own vehicle which will collide with the other vehicle. Accordingly, where the object is another vehicle, the collision position can be accurately determined.

Also, the collision position correcting portion may correct the collision position estimated by the collision position estimating portion, based on at least one of the vehicle width and vehicle length of the other vehicle.

With the above arrangement, the estimated collision position is corrected based on at least one of the vehicle width and vehicle length of the other vehicle. Accordingly, where the object is another vehicle, the collision position can be accurately determined.

More specifically, when the other vehicle is expected to collide at a generally right angle with a side face of the own vehicle, a certain area of front face of the other vehicle will collide with a certain area of the side face of the own vehicle (see FIG. 4 and FIGS. 5A-5E). In this case, the estimated collision position is corrected in view of the vehicle width of the other vehicle, so that the collision position can be accurately determined. Also, when the other vehicle is expected to collide at a generally right angle with the front face of the own vehicle, a certain area of one side face of the other vehicle will collide with a certain area of the front face of the own vehicle (see FIG. 9 and FIG. 10). In this case, the estimated collision position is corrected in view of the vehicle length of the other vehicle, so that the collision position can be accurately determined.

The collision prediction system may further include a collision angle determining portion that determines whether a collision angle as an angle formed by a travelling direction of the other vehicle with respect to a travelling direction of the own vehicle at the estimated collision time is generally equal to the right angle when the collision face determining portion determines that the own-vehicle collision face is a side face of the own vehicle, and the collision position correcting portion may correct the collision position estimated by the collision position estimating portion only when the collision angle determining portion determines that the collision angle is generally equal to the right angle.

With the above arrangement, when it is determined that the own-vehicle collision face is a side face of the own vehicle, it is determined whether the collision angle as the angle formed by the travelling direction of the other vehicle with respect to the travelling direction of the own vehicle at the estimated collision time is generally equal to the right angle. Also, the estimated collision position is corrected only when it is determined that the collision angle is generally equal to the right angle. Accordingly, the calculation load can be appropriately reduced.

Namely, when it is determined that the own-vehicle collision face is a side face of the own vehicle, and the collision angle is not a generally right angle (for example, the collision angle is about 45 degrees), one of the opposite ends of the front face of the other vehicle will collide with the side face of the own vehicle (see FIG. 7 and FIGS. 8A-8C). In this case, it is not necessary to correct the estimated collision position.

The collision angle determining portion may determine that the collision angle is generally equal to the right angle when the collision angle is equal to or larger than a preset lower-limit threshold value and is equal to or smaller than a preset upper-limit threshold value.

In the above case, it is determined that the collision angle is generally equal to the right angle when it is equal to or larger than the preset lower-limit threshold value and is equal to or smaller than the preset upper-limit threshold value. Thus, the determination as to whether the collision angle is generally equal to the right angle can be made with a simple arrangement. Also, it can be appropriately determined whether the collision angle is generally equal to the right angle, by setting the lower-limit threshold value and upper-limit threshold value to respective appropriate values.

The collision angle determining portion may determine that the collision angle is generally equal to the right angle when the collision angle is equal to or larger than 55 degrees and is equal to or smaller than 125 degrees.

With the above arrangement, it is determined that the collision angle is generally equal to the right angle when it is equal to or larger than 55 degrees and is equal to or smaller than 125 degrees. Thus, it can be appropriately determined whether the collision angle is generally equal to the right angle.

The collision position correcting portion may correct the collision position estimated by the collision position estimating portion, based on the vehicle width of the other vehicle, when the collision face determining portion determines that the own-vehicle collision face is a side face of the own vehicle.

In the above case, when it is determined that the own-vehicle collision face is a side face of the own vehicle, the estimated collision position is corrected based on the vehicle width of the other vehicle. Accordingly, the collision position can be accurately determined.

More specifically, when the other vehicle is expected to collide at a generally right angle with a side of the own vehicle, a certain area of (i.e., a part of or the entire area of) the front face of the other vehicle will collide with a certain area of the side face of the own vehicle (see FIG. 4 and FIGS. 5A-5E). Thus, the collision position can be accurately determined by making a correction in view of the vehicle width of the other vehicle.

The collision position estimating portion may estimate the collision position of the own vehicle as a position of a potential collision with a right end or a left end of a front face of the other vehicle, and the collision position correcting portion may correct the collision position estimated by the collision position estimating portion, to a position which is included in a range over which the front face of the other vehicle collides with the side face of the own vehicle at the estimated collision time and which is closer to a longitudinally central position of the own vehicle.

With the above arrangement, the collision position of the own vehicle as the position of a potential collision with the right end or left end of the front face of the other vehicle is estimated. The estimated collision position is corrected to a position which is included in the range over which the front face of the other vehicle will collide with the side face of the own vehicle at the estimated collision time, and which is closer to the longitudinally central position of the own vehicle. Accordingly, the collision position can be further accurately determined.

In the case where the other vehicle approaches the own vehicle from the front, left-hand side of the own vehicle, for example, the right end of the front face of the other vehicle is detected by a radar device (see FIG. 4), so that the position of collision between the right end of the front face of the other vehicle and the own vehicle is estimated. Also, when the other vehicle is expected to collide at a generally right angle with a side face of the own vehicle, a certain area of (i.e., a part of or the entire area of) the front face of the other vehicle will collide with a certain area of the side face of the own vehicle (see FIG. 4 and FIGS. 5A-5E). Furthermore, since a cabin or compartment in which an occupant or occupants ride is often located at a longitudinally central position of the own vehicle (namely, the occupant(s) is/are highly likely to be seated at around the longitudinally center position of the own vehicle), it is extremely important in terms of occupant protection whether a collision will take place at the location of the cabin (i.e., the longitudinally central position of the own vehicle). With the above arrangement in which the collision position is corrected to a position closer to the longitudinally central position of the own vehicle, the collision position can be appropriately corrected, taking much account of whether the collision will take place at the location of the cabin.

The collision position correcting portion may correct the collision position CPy' estimated by the collision position estimating portion, using the vehicle width $D_m$ of the other vehicle, according to the following equations (1)-(4), so as to obtain a corrected position CPy.

$$CPy=CPy'+D_m \times \sigma 1 \quad (1)$$

$$\sigma 1=0 \text{ (where } -L/2<CPy') \quad (2)$$

$$\sigma 1=(-CPy'-L/2)/(L/2) \text{ (where } -L<CPy'\leq L/2) \quad (3)$$

$$\sigma 1=1 \text{ (where } CPy'\leq -L) \quad (4)$$

where the collision position CPy' and the corrected position CPy lie on a coordinate that extends in a longitudinal direction of the own vehicle and is directed frontward, with an origin point located at a front end of the own vehicle.

With the above arrangement, the corrected position Cpy is determined by correcting the estimated collision position CPy', using the vehicle width $D_m$ of the other vehicle, based on the following equations (1) through (4): $CPy=CPy'+D_m\times \sigma 1$ (1), $\sigma 1=0$ (where $-L/2<CPy'$) (2), $\sigma 1=(-CPy'-L/2)/(L/2)$ (where $-L<CPy'\leq -L/2$) (3), $\sigma 1=1$ (where $CPy'\leq -L$), where the collision position CPy' and the corrected position CPy lie on the coordinate that extends in the longitudinal direction of the own vehicle and is directed frontward, with the origin point located at the front end of the own vehicle. Accordingly, the collision position can be further accurately determined.

More specifically, as shown in FIG. 5A-FIG. 5E, the black circles ● indicating the collision positions that have been corrected are located at more appropriate collision positions, as compared with the white circles ○ indicating the collision positions that have not been corrected. In the case as shown in FIG. 5D (where the front face of the other vehicle YV collides with a range from the rear seat to the rear end of the own vehicle MV), for example, the position CD1' of the white circle ○ indicating the collision position that has not been corrected is located at the rear end of the own vehicle MV, whereas the position CD1 of the black circle ● indicating the collision position that has been corrected is appropriately located at the position of the rear seat of the own vehicle MV.

The collision prediction system may further include a collision angle determining portion that determines whether a collision angle as an angle formed by a travelling direction of the other vehicle with respect to a travelling direction of the own vehicle at the estimated collision time is generally equal to the right angle when the collision face determining portion determines that the own-vehicle collision face is a front face of the own vehicle, and the collision position correcting portion may correct the collision position estimated by the collision position estimating portion, based on the vehicle length of the other vehicle, when the collision angle determining portion determines that the collision angle is generally equal to the right angle.

With the above arrangement, when it is determined that the own-vehicle collision face is the front face of the own vehicle, it is determined whether the collision angle as an angle formed by the travelling direction of the other vehicle with respect to the travelling direction of the own vehicle at the estimated collision time is generally equal to the right angle. If it is determined that the collision angle is generally equal to the right angle, the estimated collision position is corrected based on the vehicle length of the other vehicle. Accordingly, the collision position can be accurately determined.

Namely, when the other vehicle is expected to collide at a generally right angle with the front face of the own vehicle, a certain area of one side face of the other vehicle will collide with a certain area of the front face of the own vehicle (see FIG. 9 and FIGS. 10A-10E). Thus, the collision position can be accurately determined by making a correction in view of the vehicle length of the other vehicle.

Also, the collision angle determining portion may determine that the collision angle is generally equal to the right angle when the collision angle is equal to or larger than a preset lower-limit threshold value and is equal to or smaller than a preset upper-limit threshold value.

In the above case, it is determined that the collision angle is generally equal to the right angle when it is equal to or larger than the preset lower-limit threshold value and is equal to or smaller than the preset upper-limit threshold value. Thus, the determination as to whether the collision angle is generally equal to the right angle can be made with a simple arrangement. Also, it can be appropriately determined whether the collision angle is generally equal to the right angle, by setting the lower-limit threshold value and upper-limit threshold value to respective appropriate values.

The collision angle determining portion may determine that the collision angle is generally equal to the right angle when the collision angle is equal to or larger than 55 degrees and is equal to or smaller than 125 degrees.

With the above arrangement, it is determined that the collision angle is generally equal to the right angle when it is equal to or larger than 55 degrees and is equal to or smaller than 125 degrees. Thus, it can be appropriately determined whether the collision angle is generally equal to the right angle.

The collision position estimating portion may estimate the collision position of the own vehicle as a position of a potential collision with a right end or a left end of a front face of the other vehicle, and the collision position correcting portion may correct the collision position estimated by the collision position estimating portion, to a position which is included in a range over which a side face of the other vehicle collides with the front face of the own vehicle at the estimated collision time and which is closer to a widthwise central position of the own vehicle.

With the above arrangement, the collision position of the own vehicle as a position of a potential collision with the right or left end of the front face of the other vehicle is estimated. The estimated collision position is then corrected to a position which is included in the range over which the side face of the other vehicle will collide with the front face of the own vehicle at the estimated collision time, and which is closer to the widthwise central position of the own vehicle. Accordingly, the collision position can be further accurately determined.

In the case where the other vehicle approaches the own vehicle from the front, left-hand side of the own vehicle, for example, the right end of the front face of the other vehicle is detected by a radar device (see FIG. 9), so that the position of a collision between the right end of the front face of the other vehicle and the own vehicle is estimated. Also, when the other vehicle is expected to collide at a generally right angle with the front face of the own vehicle, a certain area of the side face of the other vehicle will collide with a certain area of the front face of the own vehicle (see FIG. 9 and FIGS. 10A-10E). With the above arrangement in which the collision position is corrected to the position closer to the widthwise central position of the own vehicle, the collision position can be appropriately corrected and determined.

The collision position correcting portion may correct the collision position CPx' estimated by the collision position estimating unit, using the vehicle width D of the own vehicle and the vehicle length $L_m$ of the other vehicle, according to the following equations (5)-(8), so as to obtain a corrected position CPx.

$$CPx = CPx' - L_m \times \sigma2 \quad (5)$$

$$\sigma2 = 0 \text{ (where } CPx' < 0) \quad (6)$$

$$\sigma2 = CPx'/(L_m + D/2) \text{ (where } 0 \leq CPx' < L_m + D/2) \quad (7)$$

$$\sigma2 = 1 \text{ (where } L_m + D/2 \leq CPx') \quad (8)$$

where the collision position CPx' and the corrected position CPx lie on a coordinate that extends in a width direction of the own vehicle and is directed in the travelling direction of the other vehicle, with an origin point located at a widthwise central position on the front face of the own vehicle.

With the above arrangement, the corrected position CPx is obtained by correcting the estimated collision position CPx', using the vehicle width D of the own vehicle and the vehicle length $L_m$ of the other vehicle, according to the following equations (5)-(8): $CPx = CPx' - L_m \times \sigma2$ (5), $\sigma2 = 0$ (where CPx' < 0) (6), $\sigma2 = CPx'/(L_m + D/2)$ (where $0 \leq CPx' < L_m + D/2$) (7), $\sigma2 = 1$ (where $L_m + D/2 \leq CPx'$) (8), where the collision position CPx' and the corrected position CPx lie on the coordinate that extends in the width direction of the own vehicle and is directed in the travelling direction of the other vehicle, with the origin point located at the widthwise central position on the front face of the own vehicle.

More specifically, as shown in FIGS. 10A-10E, the black circles ● indicating the collision positions that have been corrected are located at more appropriate collision positions, as compared with the white circles ○ indicating the collision positions that have not been corrected (=the positions of collision between the right end of the front face of the other vehicle YV and the own vehicle MV). In the case as shown in FIG. 10E (where a rear end portion of the side face of the other vehicle YV collides with the right end of the front face of the own vehicle MV), for example, the position CE3' of the white circle ○ indicating the collision position that has not been corrected is located at a position spaced apart from the own vehicle MV, whereas the position CE3 of the black circle ● indicating the collision position that has been corrected is appropriately located at the right end of the front face of the own vehicle MV.

The collision prediction system may further include a collision angle determining portion that determines whether a collision angle as an angle formed by a travelling direction of the other vehicle with respect to a travelling direction of the own vehicle at the estimated collision time is a narrow angle when the collision face determining portion determines that the own-vehicle collision face is a front face of the own vehicle, and the collision position correcting portion may correct the collision position estimated by the collision position estimating portion, based on the vehicle length and vehicle width of the other vehicle, when the collision angle determining portion determines that the collision angle is a narrow angle.

With the above arrangement, when it is determined that the own-vehicle collision face is the front face of the own vehicle, it is determined whether the collision angle as an angle formed by the travelling direction of the other vehicle with respect to the travelling direction of the own vehicle at the estimated collision time is a narrow angle. If it is determined that the collision angle is a narrow angle, the estimated collision position is corrected based on the vehicle length and vehicle width of the other vehicle. Accordingly, the collision position can be accurately determined.

Namely, when the other vehicle is expected to collide at a narrow angle with the front face of the own vehicle (i.e., when the predicted collision is a so-called oblique collision), a certain area of the front face or side face of the other vehicle will collide with a certain area of the front face of the own vehicle (see FIG. 12 and FIG. 14). Thus, the collision position can be accurately determined by making a correction in view of the vehicle length and vehicle width of the other vehicle.

Also, the collision angle determining portion may determine that the collision angle is a narrow angle when the collision angle is equal to or larger than a preset lower-limit threshold value and is equal to or smaller than a preset upper-limit threshold value.

In the above case, it is determined that the collision angle is a narrow angle when it is equal to or larger than the preset lower-limit threshold value and is equal to or smaller than the preset upper-limit threshold value. Thus, the determination as to whether the collision angle is a narrow angle can be made with a simple arrangement. Also, it can be appropriately determined whether the collision angle is a narrow angle, by setting the lower-limit threshold value and upper-limit threshold value to respective appropriate values.

The collision angle determining portion may determine that the collision angle is a narrow angle when the collision angle is equal to or larger than −75 degrees and is equal to or smaller than 75 degrees.

With the above arrangement, it is determined that the collision angle is a narrow angle when it is equal to or larger than −75 degrees and is equal to or smaller than 75 degrees. Thus, it can be appropriately determined whether the collision angle is a narrow angle.

The collision position estimating portion may estimate the collision position of the own vehicle as a position of a potential collision with a right end or a left end of a front face of the other vehicle, and the collision position correcting portion may correct the collision position estimated by the collision position estimating portion, to a position which is included in a range over which the front face of the other vehicle collides with the front face of the own vehicle at the estimated collision time and which is closer to a widthwise central position of the own vehicle (MV).

With the above arrangement, the collision position of the own vehicle as a position of a potential collision with the right or left end of the front face of the other vehicle is estimated. The estimated collision position is corrected to a position which is included in the range over which the front face of the other vehicle is presumed to collide with the front face of the own vehicle at the estimated collision time, and which is closer to the widthwise central position of the own vehicle. Accordingly, the collision position can be further accurately determined.

In the case where the other vehicle approaches the own vehicle from the front, left-hand side of the own vehicle, for example, the left end of the front face of the other vehicle is detected by a radar device (see FIG. 12), so that the position of a collision between the left end of the front face of the other vehicle and the own vehicle is estimated. Also, when the other vehicle is expected to collide at a narrow angle with the front face of the own vehicle (namely, when the predicted collision is a so-called oblique collision), a certain area of the front face or side face of the other vehicle will collide with a certain area of the front face of the own vehicle (see FIG. 12 and FIG. 14). With the above arrangement in which the collision position is corrected to the position closer to the widthwise central position of the own vehicle, the collision position can be appropriately corrected and determined.

The collision position correcting portion may correct the collision position CPx' estimated by the collision position estimating unit, using the collision angle ϵ, a vehicle width D of the own vehicle, and the vehicle length $L_m$ and vehicle width $D_m$ of the other vehicle, according to the following equations (9)-(13), so as to obtain a corrected position CPx.

$$CPx = CPx' - D_m \epsilon \times \sigma 3 \quad (9)$$

$$D_m \epsilon = L_m \times |\sin \epsilon| + D_m \times |\cos \epsilon| \quad (10)$$

$$\sigma 3 = 0 \text{ (where } CPx' < 0) \quad (11)$$

$$\sigma 3 = CPx'/(D_m \epsilon + D/2) \text{ (where } 0 \leq CPx' < D_m \epsilon + D/2) \quad (12)$$

$$\sigma 3 = 1 \text{ (where } D_m \epsilon + D/2 \leq CPx') \quad (13)$$

where the collision position CPx' and the corrected position CPx lie on a coordinate that extends in a width direction of the own vehicle and is directed in the travelling direction of the other vehicle, with an origin point located at a widthwise central position on the front face of the own vehicle.

With the above arrangement, the corrected position CPx is obtained by correcting the estimated collision position CPx', using the collision angle ϵ, vehicle width D of the own vehicle and the vehicle length $L_m$ and vehicle width $D_m$ of the other vehicle, according to the following equations (9)-(13): $x1 = CPx' - D_m \epsilon \times \sigma 3$ (9), $D_m \epsilon = L_m \times |\sin \epsilon| + D_m \times |\cos \epsilon|$ (10), $\sigma 3 = 0$ (where CPx'<0) (11), $\sigma 3 = CPx'/(D_m \epsilon + D/2)$ (where $0 \leq CPx' < D_m \epsilon + D/2$) (12), $\sigma 3 = 1$ (where $D_m \epsilon + D/2 \leq CPx'$) (13), where the collision position CPx' and the corrected position CPx lie on the coordinate that extends in the width direction of the own vehicle and is directed in the travelling direction of the other vehicle, with the origin point located at the widthwise central position on the front face of the own vehicle.

More specifically, as shown in FIGS. 15A-15E, the black circles ● indicating the collision positions that have been corrected are located at more appropriate collision positions, as compared with the white circles ○ indicating the collision positions that have not been corrected (=the positions of collision between the left end of the front face of the other vehicle YV and the own vehicle MV). In the case as shown in FIG. 15E (where the rear end of the side face of the other vehicle YV collides with the right end of the front face of the own vehicle MV), for example, the position CE4' of the white circle ○ indicating the collision position that has not been corrected is located at a position that is spaced apart from the own vehicle MV, whereas the position CE4 of the black circle ● indicating the collision position that has been corrected is appropriately located at the right end of the front face of the own vehicle MV.

A second aspect of the invention provides a collision predicting method for predicting a collision of an own vehicle with an object detected via a radar device. The collision predicting method includes a step of determining a collision face of the own vehicle which is presumed to collide with the object, based on a travelling direction of the object relative to the own vehicle at an estimated collision time at which a collision is presumed to occur, a step of estimating a collision position of the own vehicle as a position of a potential collision with the object, based on the collision face determined in the step of determining a collision face, and correcting the collision position estimated in the step of estimating a collision position, based on a preset size of the object.

According to the second aspect of the invention, the collision face of the own vehicle which is presumed to collide with the object is determined, based on the travelling direction of the object relative to the own vehicle at the estimated collision time at which the collision is presumed to occur. Also, the collision position of the own vehicle at which the own vehicle will collide with the object is estimated based on the determined collision face. Furthermore, the estimated collision position is corrected based on the preset size of the object. Accordingly, the collision position can be accurately determined.

Since the estimated collision position is corrected based on the preset size of the object, the collision position can be accurately determined. For example, if the object is another vehicle, and the other vehicle is expected to collide at a generally right angle with a side face of the own vehicle, a certain area of (i.e., a part of or the entire area of) the front face of the other vehicle will collide with a certain area of the side face of the own vehicle (see FIG. 4 and FIGS. 5A-5E). In this case, if the collision position is corrected in view of the vehicle width of the other vehicle, the collision position can be accurately determined.

BRIEF DESCRIPTION OF THE DRAWINGS

The foregoing and further features and advantages of the invention will become apparent from the following description of example embodiments with reference to the accompanying drawings, wherein like numerals are used to represent like elements, and wherein.

DETAILED DESCRIPTION OF EMBODIMENTS

Figure 1:
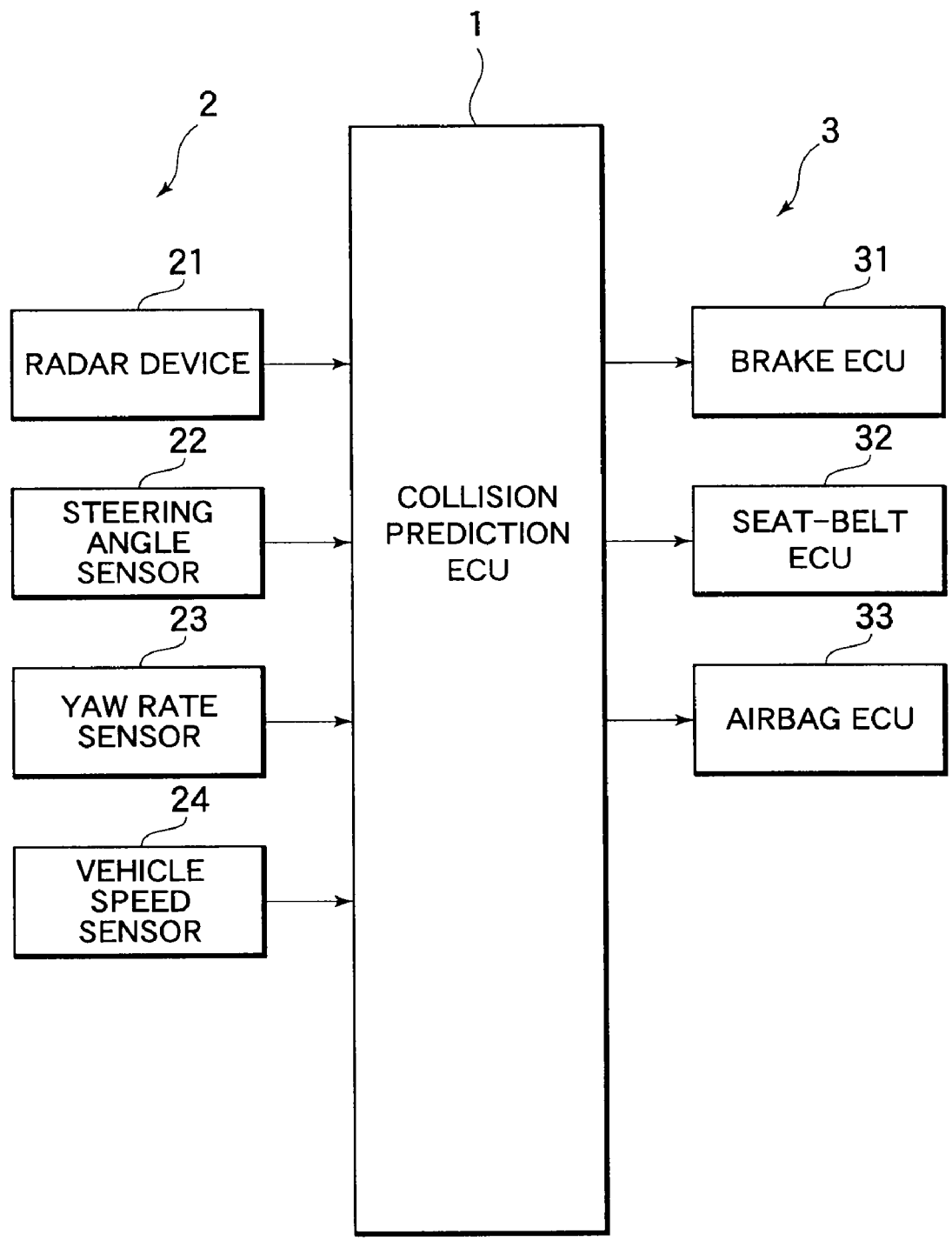
FIG. 1 is a block diagram showing one example of the configuration of a collision prediction system according to one embodiment of the invention.
Figure 2:
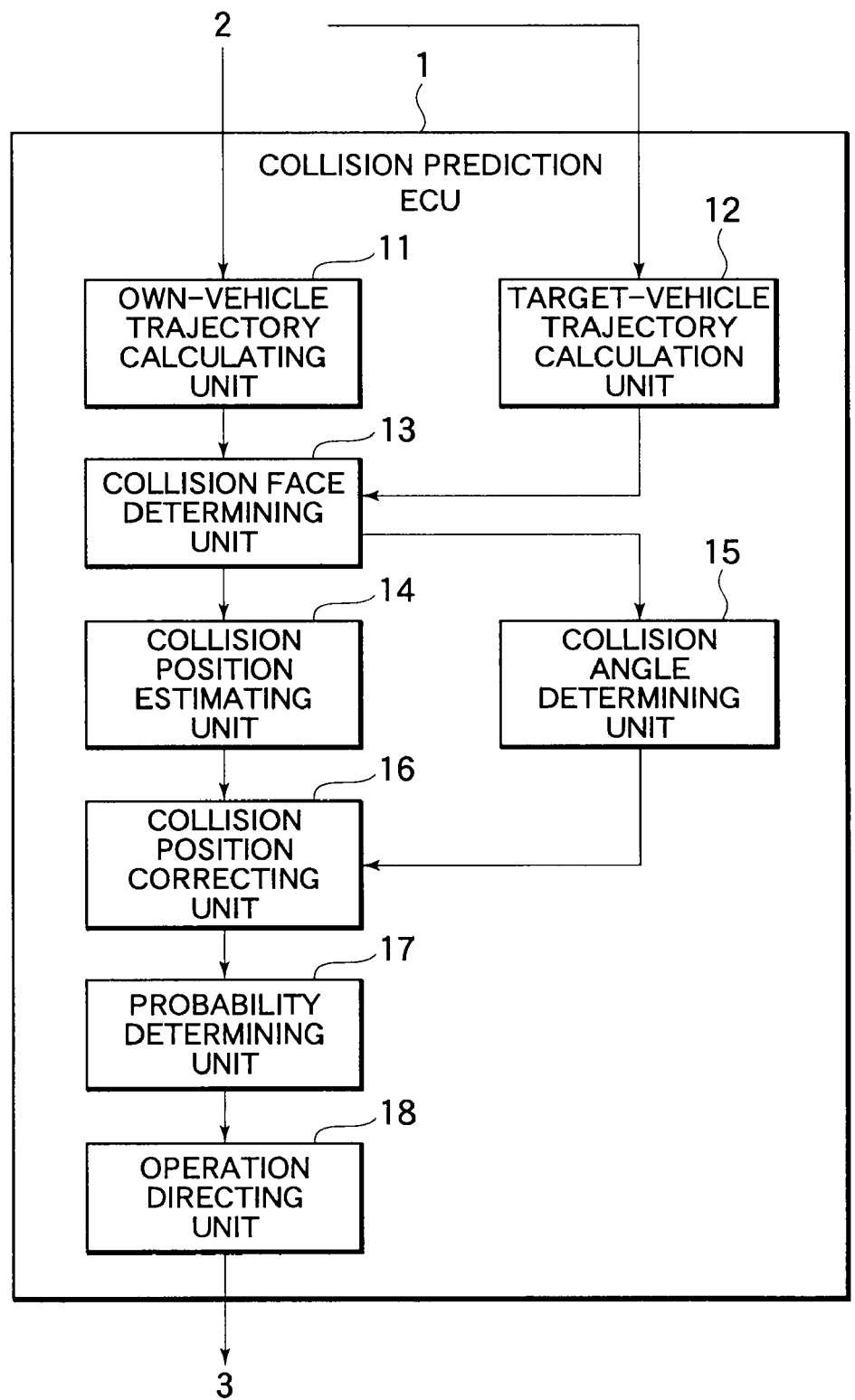
FIG. 2 is a block diagram showing one example of the functional configuration of a collision prediction ECU.

A collision prediction system and a collision predicting method according to one embodiment of the invention will be described with reference to the drawings. The collision prediction system according to the invention is installed on an own vehicle, and is configured to predict a collision between an object detected via a radar device and the own vehicle. Referring initially to FIG. 1 and FIG. 2, one example of the configuration of the collision prediction system installed on the vehicle will be described.

FIG. 1 is a block diagram showing one example of the configuration of the collision prediction system according to the invention. As shown in FIG. 1, a collision prediction ECU (electronic control unit) 1 (which may be regarded as corresponding to the collision prediction system) according to the invention is connected to input devices 2 and output devices 3 as peripheral equipment, such that the collision prediction ECU 1 can communicate with the input and output devices 2, 3.

Referring first to FIG. 1, the input devices 2 of the collision prediction ECU 1 will be described. The input devices 2 include a radar device 21, a steering angle sensor 22, a yaw rate sensor 23, and a vehicle speed sensor 24.

The radar device 21 is operable to detect, via millimeter waves or the like, the relative position and relative velocity of an object present in the surroundings of the own vehicle, with respect to the own vehicle. In operation, the radar device 21 sends signals indicative of the relative position and the relative velocity to the collision prediction ECU 1 (more specifically, a target vehicle trajectory calculating unit 12 as shown in FIG. 2). In this embodiment, the radar device 21 includes two radar sensors 21L, 21R mounted on a front face of the own vehicle MV, and is operable to detect the relative position and relative velocity of an object (another vehicle or target vehicle YV in this embodiment) ahead of the own vehicle MV, as will be described later with reference to FIG. 13.

While the case where the radar device 21 detects the target vehicle YV ahead of the own vehicle MV will be described in this embodiment, the radar device 21 may detect any object present in the surroundings of the own vehicle MV. For example, the radar device 21 may detect an object located on one side of and forward of the own vehicle MV, or may detect an object located rearward of the own vehicle MV. Also, while the case where the object is another vehicle YV (which will also be referred to "target vehicle") in this embodiment, the object may be another type of object (such as a bicycle or a pedestrian).

The steering angle sensor 22 is a sensor for detecting the steering angle, and sends a signal indicative of the steering angle to the collision prediction ECU 1 (more specifically, an own-vehicle trajectory calculating unit 11 as shown in FIG. 2). The yaw rate sensor 23 consists of, for example, a rate gyro, and is operable to detect the yaw rate that represents the rate of change of the yaw angle (=the rate of change of the turning angle about the vertical axis passing the center of gravity of the vehicle). In operation, the yaw rate sensor 23 sends a signal indicative of the yaw rate to the collision prediction ECU 1 (more specifically, the own-vehicle trajectory calculating unit 11 as shown in FIG. 2). The vehicle speed sensor 24 is a sensor for detecting the vehicle speed, and sends a signal indicative of the vehicle speed to the collision prediction ECU 1 (more specifically, the own-vehicle trajectory calculating unit 11 as shown in FIG. 2).

Next, the output devices 3 of the collision prediction ECU 1 will be described with reference to FIG. 1. The output devices 3 include a brake ECU 31, a seat-belt ECU 32, and an airbag ECU 33.

The brake ECU 31 is configured to apply a brake to the own vehicle MV via a brake system, according to a command from the collision prediction ECU 1 (more specifically, an operation directing unit 18 as shown in FIG. 2), so as to protect an occupant(s) at the time of a collision of the own vehicle MV.

The seat-belt ECU 32 is configured to apply tension to the seat belt(s) according to a command from the collision prediction ECU 1 (more specifically, the operating directing unit 18 as shown in FIG. 2), so as to protect the occupant(s) at the time of a collision of the own vehicle MV.

The airbag ECU 33 is configured to expand the airbag(s) according to a command from the collision prediction ECU 1 (more specifically, the operating directing unit 18 as shown in FIG. 2), so as to protect the occupant(s) at the time of a collision of the own vehicle MV.

FIG. 2 is a block diagram showing one example of the functional configuration of the collision prediction ECU 1. As shown in FIG. 2, the collision prediction ECU 1 includes the above-mentioned own-vehicle trajectory calculating unit 11, target-vehicle trajectory calculating unit 12, a collision face determining unit 13, a collision position estimating unit 14, a collision angle determining unit 15, a collision position correcting unit 16, a probability determining unit 17 and the above-mentioned operation directing unit 18, as its functional units.

The collision prediction ECU 1 has a microcomputer provided at a suitable location of the collision prediction ECU 1. By executing control programs stored in advance in ROM (read-only memory), or the like, provided at a suitable location of the collision prediction ECU 1, the microcomputer functions as any of the functional units, including the own-vehicle trajectory calculating unit 11, target-vehicle trajectory calculating unit 12, collision face determining unit 13, collision position estimating unit 14, collision angle determining unit 15, collision position correcting unit 16, probability determining unit 17 and the operation directing unit 18.

The own-vehicle trajectory calculating unit 11 is a functional unit for calculating the trajectory of travel of the own vehicle MV, based on, for example, information from the steering angle sensor 22, yaw rate sensor 23 and the vehicle speed sensor 24. In this embodiment, the own-vehicle trajectory calculating unit 11 calculates the travel trajectory of the own vehicle MV in the form of an arc (see FIG. 4, for example).

The target-vehicle trajectory calculating unit 12 is a functional unit for calculating the trajectory of travel of the target vehicle YV, based on information from the radar device 21, for example. In this embodiment, the target-vehicle trajectory calculating unit 12 calculates the travel trajectory of the target vehicle YV in the form of a straight line (see FIG. 4, for example).

The collision face determining unit 13 (which may be regarded as corresponding to the collision face determining means) is a functional unit for determining the face of collision of the own vehicle MV with the target vehicle YV, based on the travelling direction of the target vehicle YV relative to the own vehicle at an estimated collision time as a point in time at which a collision of the own vehicle MV with the target vehicle YV is estimated to occur. More specifically, the collision face determining unit 13 selects a predictive collision face from a plurality of candidates (e.g., side faces, front face, etc.), and determines whether a condition (which will be described later, referring to FIG. 4, FIG. 7, etc.) under which a collision will occur on the selected collision face is satisfied. Then, the collision face determining unit 13 determines the collision face with respect to which the condition for the occurrence of a collision is satisfied, as a collision face of the own vehicle MV with the target vehicle YV. The method by which the collision face determining unit 13 determines whether the condition for the occurrence of a collision is satisfied will be more specifically described later, with reference to FIG. 4, FIG. 7, FIG. 9, FIG. 12, etc.

The collision position estimating unit 14 (which may be regarded as corresponding to the collision position estimating means) is a functional unit for estimating the position of collision of the own vehicle MV with the target vehicle YV, based on the collision face determined by the collision face determining unit 13. More specifically, the collision position estimating unit 14 estimates the collision position on the own vehicle MV, at which the own vehicle collides with the right end (or left end) of the front face of the target vehicle YV as an acquisition point captured by the radar device 21 shown in FIG. 1. The method by which the collision position estimating unit 14 estimates the collision position will be more specifically described later, with reference to FIG. 4, FIG. 7, FIG. 9, FIG. 12, etc.

The collision angle determining unit 15 (which may be regarded as corresponding to the collision angle determining means) is a functional unit for determining whether a collision angle $\epsilon$ as an angle formed by the travelling direction of the target vehicle YV with respect to the travelling direction of the own vehicle MV at the estimated collision time is generally equal to the right angle (namely, whether the predicted collision is a so-called "side-face, right-angle collision"), when the collision face determining unit 13 determines that the collision face of the own vehicle is a side face of the own vehicle MV. More specifically, the collision angle determining unit 15 determines that the collision angle $\epsilon$ is generally equal to the right angle when the angle $\epsilon$ is equal to or larger than a preset lower-limit threshold value (e.g., 55 degrees) and is equal to or smaller than a preset upper-limit threshold value (e.g., 125 degrees).

When the collision face determining unit 13 determines that the own-vehicle collision face is the front face of the own vehicle MV, the collision angle determining unit 15 determines whether the collision angle $\epsilon$ as an angle formed by the travelling direction of the target vehicle YV with respect to the travelling direction of the own vehicle MV at the estimated collision time is generally equal to the right angle (namely, whether the predicted collision is a so-called "front-face right-angle collision"). More specifically, the collision angle determining unit 15 determines that the collision angle $\epsilon$ is generally equal to the right angle when the angle $\epsilon$ is equal to or larger than a preset lower-limit threshold value (e.g., 55 degrees) and is equal to or smaller than a preset upper-limit threshold value (e.g., 125 degrees).

When the collision face determining unit 13 determines that the own-vehicle collision face is the front face of the own vehicle MV, the collision angle determining unit 15 determines whether the collision angle $\epsilon$ as an angle formed by the travelling direction of the target vehicle YV with respect to the travelling direction of the own vehicle MV at the estimated collision time is a narrow angle (namely, whether the predicted collision is a so-called "front-face oblique collision"). More specifically, the collision angle determining unit 15 determines that the collision angle $\epsilon$ is a narrow angle when the angle $\epsilon$ is equal to or larger than a preset lower-limit threshold value (e.g., −75 degrees) and is equal to or smaller than a preset upper-limit threshold value (e.g., 75 degrees).

The collision position correcting unit 16 (which may be regarded as corresponding to the collision position correcting means) is a functional unit for correcting the collision position estimated by the collision position estimating unit 14, based on the size of the target vehicle YV which is set in advance. Here, the "size of the target vehicle YV" is "at least one of the vehicle width $D_m$ and vehicle length $L_m$ of the target vehicle YV".

When the collision face determining unit 13 determines that the own-vehicle collision face is a side face of the own vehicle MV, the collision position correcting unit 16 corrects the collision position estimated by the collision position estimating unit 14, based on the vehicle width $D_m$ of the target vehicle YV, only in the case where the collision angle determining unit 15 determines that the collision angle $\epsilon$ is generally equal to the right angle. The method by which the collision position correcting unit 16 corrects the collision position will be more specifically described later, with reference to FIGS. 5A-5E and FIG. 6.

Thus, the estimated collision position is corrected only when the collision angle $\epsilon$ is generally equal to the right angle (namely, when the predicted collision is the "side-face right-angle collision"); therefore, the calculation load can be appropriately reduced. Namely, when it is determined that the own-vehicle collision face is a side face of the own vehicle MV, and the collision angle $\epsilon$ is not a generally right angle (for example, when the collision angle is about 45 degrees), one of the opposite ends of the front face of the target vehicle YV (in FIG. 7, the left end of the front face of the target vehicle YV) is supposed to collide with the side face of the own vehicle MV (see FIG. 7 and FIGS. 8A-8C); therefore, the estimated collision position need not be corrected. Namely, when it is not necessary to correct the collision position (i.e., when the predicted collision is the "side-face oblique collision"), the processing for correcting the collision position is not carried out, and therefore, the calculation load can be appropriately reduced.

As described above, it is determined that the collision angle $\epsilon$ is generally equal to the right angle if it is equal to or larger than the preset lower-limit threshold value and is equal to or smaller than the preset upper-limit threshold value. Thus, the determination as to whether the collision angle $\epsilon$ is generally equal to the right angle can be made with a simple configuration or arrangement. Furthermore, it can be appropriately determined whether the collision angle $\epsilon$ is generally equal to the right angle, by setting the lower-limit threshold value and upper-limit threshold value to appropriate values (e.g., the lower-limit threshold value=55 degrees, the upper-limit threshold value=125 degrees).

While the lower-limit threshold value is equal to 55 degrees and the upper-limit threshold value is equal to 125 degrees in this embodiment, at least one of the lower-limit threshold value and the upper-limit threshold value may be equal to another value. For example, the lower-limit threshold value may be equal to 75 degrees, and the upper-limit threshold value may be equal to 105 degrees. In this case, the calculation load can be further reduced.

When the collision face determining unit 13 determines that the own-vehicle collision face is the front face of the own vehicle MV, and the collision angle determining unit 15 determines that the collision angle ϵ is generally equal to the right angle, the collision position correcting unit 16 corrects the collision position estimated by the collision position estimating unit 14, based on the vehicle length $L_m$ of the target vehicle YV. The method by which the collision position correcting unit 16 corrects the collision position will be more specifically described later, with reference to FIGS. 10A-10E and FIG. 11.

Thus, when it is determined that the collision angle ϵ is generally equal to the right angle (namely, when the predicted collision is the "front-face right-angle collision"), the estimated collision position is corrected based on the vehicle length $L_m$ of the target vehicle YV. Accordingly, the collision position can be accurately determined.

More specifically, when the target vehicle YV collides at a generally right angle with the front face of the own vehicle MV, a certain area of one side face of the target vehicle YV is brought into collision with a certain area of the front face of the own vehicle MV (see FIG. 9 and FIGS. 10A-10E). Therefore, the collision position can be accurately determined by making a correction in view of the vehicle length $L_m$ of the target vehicle YV.

As described above, it is determined that the collision angle ϵ is generally equal to the right angle if it is equal to or larger than the preset lower-limit threshold value and is equal to or smaller than the preset upper-limit threshold value. Thus, the determination as to whether the collision angle ϵ is generally equal to the right angle can be made with a simple configuration or arrangement. Furthermore, it can be appropriately determined whether the collision angle ϵ is generally equal to the right angle, by setting the lower-limit threshold value and the upper-limit threshold value to appropriate values (e.g., the lower-limit threshold value=55 degrees, the upper-limit threshold value=125 degrees).

While the lower-limit threshold value is equal to 55 degrees and the upper-limit threshold value is equal to 125 degrees in this embodiment, at least one of the lower-limit threshold value and the upper-limit threshold value may be equal to another value. For example, the lower-limit threshold value may be equal to 75 degrees, and the upper-limit threshold value may be equal to 105 degrees. In this case, the calculation load can be further reduced.

In addition, when the collision face determining unit 13 determines that the own-vehicle collision face is the front face of the own vehicle MV and the collision angle determining unit 15 determines that the collision angle ϵ is a narrow angle, the collision position correcting unit 16 corrects the collision position estimated by the collision position estimating unit 14, based on the vehicle width $D_m$ and vehicle length $L_m$ of the target vehicle YV. The method by which the collision position correcting unit 16 corrects the collision position will be more specifically described later, with reference to FIG. 14 and FIGS. 15A-15E.

Thus, when it is determined that the collision angle ϵ is a narrow angle (namely, when the predicted collision is the "front-face oblique collision"), the estimated collision position is corrected based on the vehicle length $L_m$ and vehicle width $D_m$ of the target vehicle YV. Accordingly, the collision position can be accurately determined. Namely, when the target vehicle YV collides at a narrow angle with the front face of the own vehicle MV, a certain area of the front face or side face of the target vehicle YV is brought into collision with a certain area of the front face of the own vehicle MV (see FIG. 12 and FIG. 14). Therefore, the collision position can be accurately determined by making a correction in view of the vehicle length $L_m$ and vehicle width $D_m$ of the target vehicle YV.

As described above, it is determined that the collision angle ϵ is a narrow angle if it is equal to or larger than the preset lower-limit threshold value and is equal to or smaller than the preset upper-limit threshold value. Thus, the determination as to whether the collision angle ϵ is a narrow angle can be made with a simple configuration or arrangement. Furthermore, it can be appropriately determined whether the collision angle ϵ is a narrow angle, by setting the lower-limit threshold value and the upper-limit threshold value to appropriate values (e.g., the lower-limit threshold value=−75 degrees, the upper-limit threshold value=75 degrees).

While the lower-limit threshold value is equal to −75 degrees and the upper-limit threshold value is equal to 75 degrees in this embodiment, at least one of the lower-limit threshold value and the upper-limit threshold value may be equal to another value. For example, the lower-limit threshold value may be equal to −45 degrees and the upper-limit threshold value may be equal to 45 degrees. In this case, the calculation load can be further reduced.

The probability determining unit 17 is a functional unit that obtains the probability of the occurrence of a collision (which will be called "collision probability P"), based on the collision position corrected two or more times by the collision position correcting unit 16, and determines whether the obtained collision probability P is equal to or higher than a preset threshold value Psh. A more detailed method of calculating the collision probability P is described in, for example, Japanese Patent Application Publication No. 2008-216213 (JP-A-2008-216213), and therefore will not be described herein.

The operation directing unit 18 is a functional unit for applying a brake to the own vehicle MV via the brake ECU 31 or activating an occupant protecting device or devices, such as a seat belt and an airbag, via the seat-belt ECU 32, airbag ECU 33, or the like, when the probability determining unit 17 determines that the collision probability P is equal to or higher than the preset threshold value Psh.

Figure 3A:
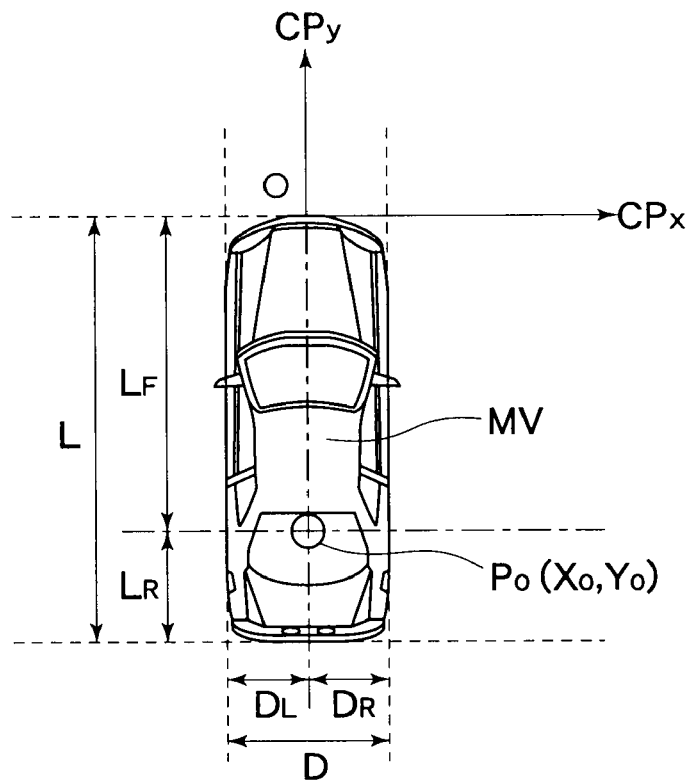
FIGS. 3A-3B are plan views showing one example of coordinates, dimensions of vehicles, etc. for use in a collision position estimating unit, collision position correcting unit and other units.
Figure 3B:
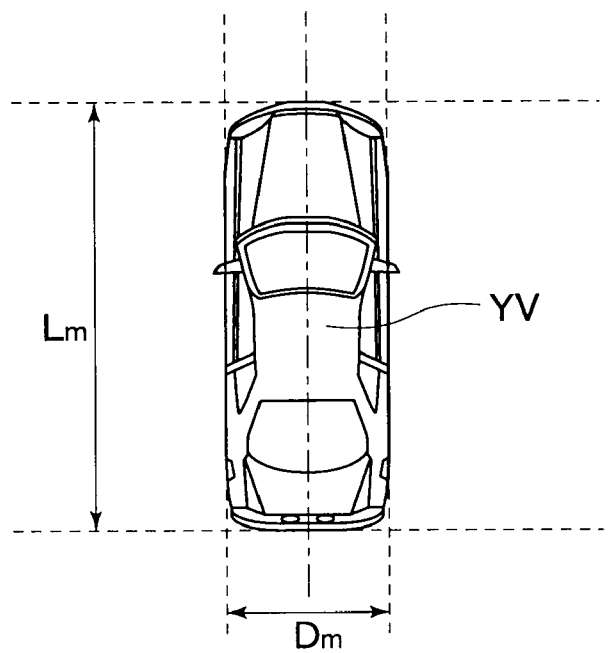

FIGS. 3A-3B are plan views showing one example of a coordinate system, the size of each vehicle, etc. which are used by the collision position estimating unit 14, collision position correcting unit 16, and other units. FIG. 3A is a plan view of the own vehicle MV, and FIG. 3B is a plan view of the target vehicle YV. As shown in FIG. 3A, the size of the own vehicle MV is represented by the vehicle width D and the vehicle length L. The reference position of the own vehicle MV lies on the center $P_0(X_0, Y_0)$ of the rear axle as a width-wise (or laterally) central position of the axle of the rear wheels. The above-mentioned vehicle length L is divided into a front-side vehicle length $L_F$ as the length of a portion of the vehicle located frontward of the rear-axle center $P_0$, and a rear-side vehicle length $L_R$ as the length of a portion of the vehicle located rearward of the rear-axle center $P_0$. Similarly, the vehicle width D is divided into a right-side vehicle width $D_R$ as the width of a portion of the vehicle located on the right-hand side of the rear-axle center $P_0$, and a left-side vehicle width $D_L$ as the width of a portion of the vehicle located on the left-hand side of the rear-axle center $P_0$. In this embodiment, each of the right-side vehicle width $D_R$ and the left-side vehicle width $D_L$ is equal to a half of the vehicle width $D$.

A CP coordinate system having a coordinate axis CPx that extends in the width direction of the vehicle and a coordinate axis CPy that extends in the longitudinal direction of the vehicle is provided as a coordinate system that defines the collision position. In the CP coordinate system, the origin is located at a widthwise central position of the front face of the own vehicle MV, and the CPx coordinate values increase rightward (FIG. 3) in the width direction while the CPy coordinate values increase frontward in the longitudinal direction. The collision position estimating unit 14 estimates the collision position on the CP coordinate system, and the collision position correcting unit 16 corrects the collision position on the CP coordinate system.

As shown in FIG. 3B, the size of the target vehicle YV is represented by the vehicle width $D_m$ and the vehicle length $L_m$. For example, the vehicle width $D_m$ and the vehicle length $L_m$ are set in advance to respective values (e.g., $D_m$=1.725 m, $L_m$=4.445 m) equivalent to the size of a standard passenger car.

Referring next to FIG. 4 through FIGS. 15A-15E, the method by which the collision face determining unit 13 determines whether a collision will occur, the method by which the collision position estimating unit 14 estimates the collision position, and the method by which the collision position correcting unit 16 corrects the collision position will be sequentially described in detail, with respect to each of the case where the predicted collision is the above-mentioned "side-face right-angle collision", the case where the collision is the "side-face oblique collision", the case where the collision is the "front-face right-angle collision", and the case where the collision is the "front-face oblique collision".

In this embodiment, the case where the target vehicle YV approaches the own vehicle MV from the front, left-hand side of the own vehicle MV will be explained, for the sake of convenience. However, the methods as described below may also be applied to the case where the target vehicle YV approaches the own vehicle MV from the front, right-hand side of the own vehicle MV. In the case where the target vehicle YV approaches the own vehicle MV from the front, right-hand side thereof, the CPx axis of the CP coordinate system as shown in FIG. 3A is directed leftward, so that the equations as indicated below can be applied to this case without being modified.

Figure 4:
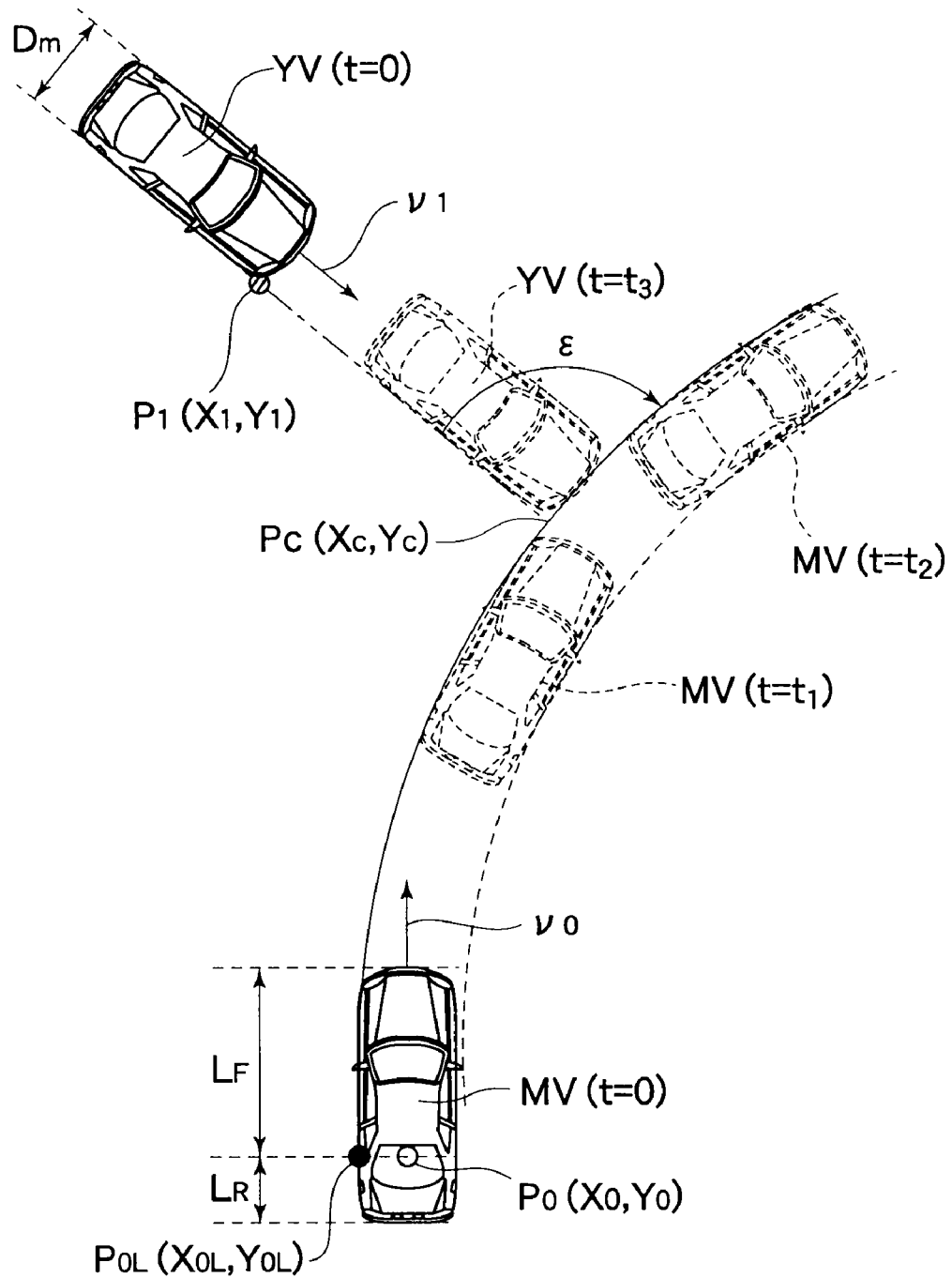
FIG. 4 is a plan view showing one example of a method of determining whether a collision will occur where the collision is "side-face right-angle collision"
Figure 5A:
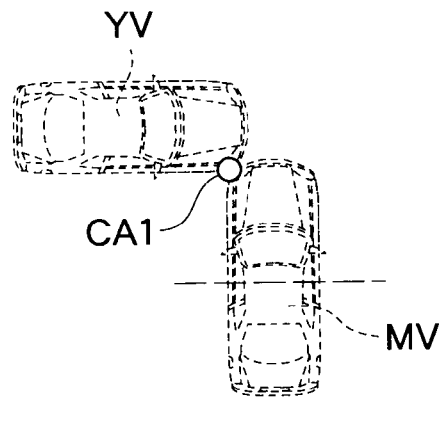
FIGS. 5A-5E are plan views showing one example of a method of correcting the collision position when the predicted collision is "side-face right-angle collision"
Figure 5D:
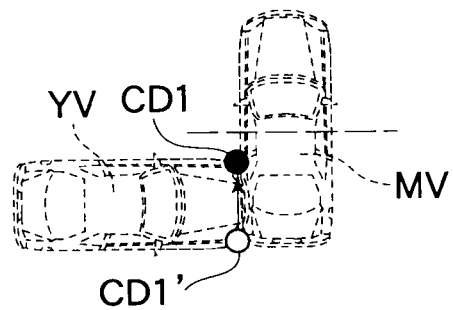
Figure 5B:
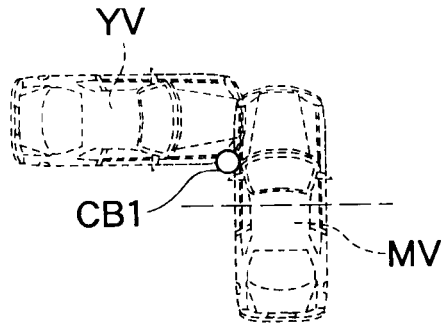
Figure 5E:
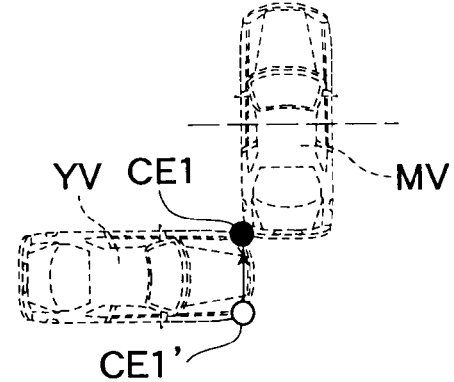
Figure 5C:
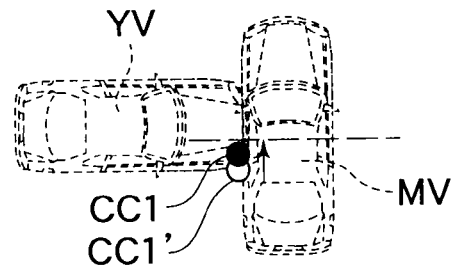
Figure 6:
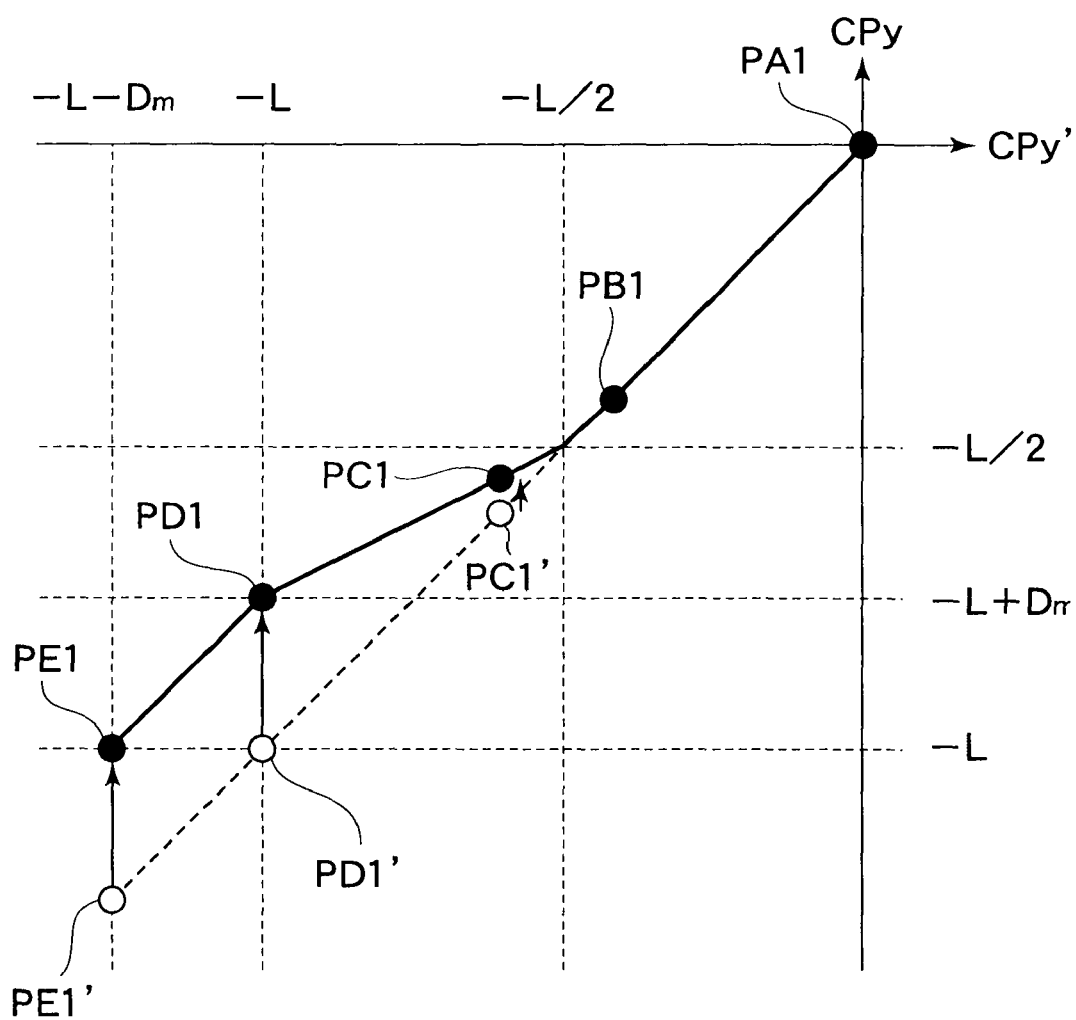
FIG. 6 is a graph showing one example of the method of correcting the collision position when the predicted collision is "side-face right-angle collision"

Side-face Right-angle Collision FIG. 4 through FIG. 6 are views useful for explaining one example of a method of estimating a collision position, and other methods, in the case where the predicted collision is the "side-face right-angle collision". FIG. 4 is a plan view showing one example of a method of determining whether a collision will occur where the collision concerned is the "side-face right-angle collision".

Suppose the target vehicle YV approaches the own vehicle MV from the front, left-hand side of the own vehicle MV, as shown in FIG. 4. The own-vehicle trajectory calculating unit 11 determines the travel trajectory of the own vehicle MV in the form of an arc, and the target-vehicle trajectory calculating unit 12 determines the travel trajectory of the target vehicle YV in the form of a straight line. The radar device 21 detects the right end of the front face of the target vehicle YV as an acquisition point $P_1(X_1, Y_1)$. In this case, the collision position $P_C(X_C, Y_C)$ is defined as an intersection point of the trajectory of the acquisition point $P_1$ of the target vehicle YV and the trajectory of point $P_{0L}(X_{0L}, Y_{0L})$ on the left side face of the own vehicle MV which lies on the rear axle that passes the rear-axle center $P_0(X_0, Y_0)$.

Time $t_1$ it takes for the front end of the own vehicle MV to reach the collision position $P_C$, time $t_2$ it takes for the rear end of the own vehicle MV to reach a position ahead of the collision position $P_C$ by a distance equal to the vehicle width $D_m$ of the target vehicle YV, and time $t_3$ it takes for the front end (=the acquisition point $P_1$) of the target vehicle YV to reach the collision position $P_C$ are obtained according to the following equations (14), (15), (16).

$$t_1 = (((X_{0L}-X_C)^2+(Y_{0L}-Y_C)^2)^{1/2}-L_F)/v_0 \quad (14)$$

$$t_2 = (((X_{0L}-X_C)^2+(Y_{0L}-Y_C)^2)^{1/2}+D_m+L_R)/v_0 \quad (15)$$

$$t_3 = ((X_1-X_C)^2+(Y_1-Y_C)^2)^{1/2}/v_1 \quad (16)$$

In the above equations (14)-(16), $v_0$ represents the velocity of the own vehicle MV, and $v_1$ represents the velocity of the target vehicle YV. Also, $L_F$ represents the front-side vehicle length of the own vehicle MV, and $D_m$ represents the vehicle width of the target vehicle YV, while $L_R$ represents the rear-side vehicle length of the own vehicle MV (see FIG. 3A).

A condition under which the collision face determining unit 13 determines that a collision will occur is represented by the following equation (17).

$$t_1 \leq t_3 \leq t_2 \quad (17)$$

Namely, when the collision face determining unit 13 determines that the above equation (17) is satisfied, it determines that the side face of the own vehicle MV is a potential collision face. Then, the collision position estimating unit 14 estimates the coordinates (CPx, CPy') of the collision position on the CP coordinate system (see FIG. 3A), using the following equations (18), (19).

$$CPx = -D_L \quad (18)$$

$$CPy' = ((X_{0L}-X_C)^2+((Y_{0L}-Y_C)^2)^{1/2}-v_0 \times t_3 - L_F \quad (19)$$

FIGS. 5A-5E are plan views showing one example of a method of correcting the collision position via the collision position correcting unit 16 in the case where the predicted collision is the "side-face right-angle collision". Each of the white circles ○ indicated in FIGS. 5A-5E represents one example of the collision position obtained according to the above equations (18) and (19). Also, each of the black circles ● indicated in FIGS. 5C-5E represents one example of the collision position corrected by the collision position correcting unit 16 according to the above-indicated equations (1) through (4). In the following, the equations (1) through (4) are presented again for the sake of convenience. Here, it is assumed that the collision angle $\epsilon$ is generally equal to the right angle (in this embodiment, the collision angle $\epsilon$ is equal to or larger than 55 degrees and equal to or smaller than 125 degrees).

$$CPy = CPy' + D_m \times \sigma 1 \quad (1)$$

$$\sigma 1 = 0 \text{ (where } -L/2 < CPy'\text{)} \quad (2)$$

$$\sigma 1 = (-CPy'-L/2)/(L/2) \text{ (where } -L < CPy' \leq -L/2\text{)} \quad (3)$$

$$\sigma 1 = 1 \text{ (where } CPy' \leq -L\text{)} \quad (4)$$

As indicated in the above equations (1) through (4), when it is determined that the own-vehicle collision face is a side face of the own vehicle MV and it is determined that the collision angle $\epsilon$ is generally equal to the right angle (namely, when the predicted collision is the "side-face right-angle collision"), the estimated collision position is corrected based on the vehicle width $D_m$ of the target vehicle YV, so that the collision position can be determined with high accuracy. More specifically, when the target vehicle YV collides at a generally right angle with the side face of the own vehicle MV, a certain area of (i.e., a part of or the entire area of) the front face of the target vehicle YV is brought into collision with a certain area of the side face of the own vehicle MV (see FIG. 4 and FIGS. 5A-5E). Therefore, the collision position can be accurately determined by making a correction in view of the vehicle width $D_m$ of the target vehicle YV.

As shown in FIG. 5A-FIG. 5E, the collision position correcting unit 16 corrects the collision position estimated by the collision position estimating unit 14 by shifting it to a position which is included in a range over which the front face of the target vehicle YV collides with the side face of the own vehicle MV at the estimated collision time and which is closer to a longitudinally central position (position indicated by a one-dot chain line in the figures) of the own vehicle MV. In the case as shown in FIG. 5D (where the front face of the target vehicle YV collides with a range from the rear seat to the rear end of the own vehicle MV), for example, the position CD1' of the white circle ○ indicating the collision position that has not been corrected is located at the rear end of the own vehicle MV, whereas the position CD1 of the black circle ● indicating the collision position that has been corrected is appropriately located at the position of the rear seat of the own vehicle MV.

FIG. 6 is a graph indicating one example of the method of correcting the collision position via the collision position correcting unit 16 in the case where the predicted collision is the "side-face right-angle collision". In FIG. 6, the horizontal axis indicates the CPy' coordinate of the collision position that has not been corrected, and the vertical axis indicates the CPy coordinate of the collision position that has been corrected. Points PA1, PB, PC1'-PE1' shown in FIG. 6 correspond to the positions CA1, CB1 CC1'-CE1' of the white circles ○ indicating the collision positions that have not been corrected in FIGS. 5A-5E. Also, points PC1-PE1 shown in FIG. 6 correspond to the positions CC1-CE1 of the black circles ● indicating the collision positions that have been corrected in FIGS. 5C-5E.

For example, point PD1' (CPy'=−L) indicating the collision position that has not been corrected in FIG. 5D is corrected to point PD1 (CPy=−L+$D_m$) indicating the corrected collision position, as shown in FIG. 6. Also, point PE1' (CPy'=−L−$D_m$) indicating the collision position that has not been corrected in FIG. 5E is corrected to point PE1 (CPy=−L) indicating the corrected collision position.

In the above manner, the collision position is appropriately corrected by the collision position correcting unit 16, so that the collision position can be further accurately determined. For example, when the target vehicle YV approaches the own vehicle MV from the front, left-hand side of the own vehicle MV, the right end of the front face of the target vehicle YV is detected by the radar device 21 (see FIG. 4), and therefore, the position of collision between the right end of the front face of the target vehicle YV and the own vehicle MV is estimated. Also, when the target vehicle YV collides at a generally right angle with the side face of the own vehicle MV, a certain area of (i.e., a part of or the entire area of) the front face of the target vehicle YV is brought into collision with a certain area of the side face of the own vehicle MV (see FIG. 4 and FIGS. 5A-5E). Furthermore, since a cabin or compartment in which an occupant or occupants ride is often located at a longitudinally central position of the own vehicle MV (namely, the occupant(s) is/are highly likely to be seated at around the longitudinally central position of the own vehicle MV), it is extremely important in terms of occupant protection whether a collision will take place at the location of the cabin (in this case, the longitudinally central position of the own vehicle). With the above arrangement in which the collision position correcting unit 16 corrects the collision position to a position closer to the longitudinally central position of the own vehicle MV, the collision position can be appropriately corrected, taking much account of whether the collision will take place at the location of the cabin.

While the collision position correcting unit 16 corrects the collision position according to the above-indicated equations (1)-(4) in this embodiment where the "side-face right-angle collision" is presumed to occur, the collision position correcting unit 16 may correct the collision position by other methods. For example, the collision position may be corrected to a position on the front face of the target vehicle YV that collides with the side face of the own vehicle MV, which position is closest to the longitudinally central position of the own vehicle MV. In this case, if a collision as indicated in FIG. 5C is predicted, for example, the longitudinally central position (indicated by the one-dot chain line in FIG. 5C) of the own vehicle MV is included in a range or area of the side face of the own vehicle MV with which the front face of the target vehicle YV collides, and therefore, the collision position is corrected to the longitudinally central position of the own vehicle MV.

Figure 7:
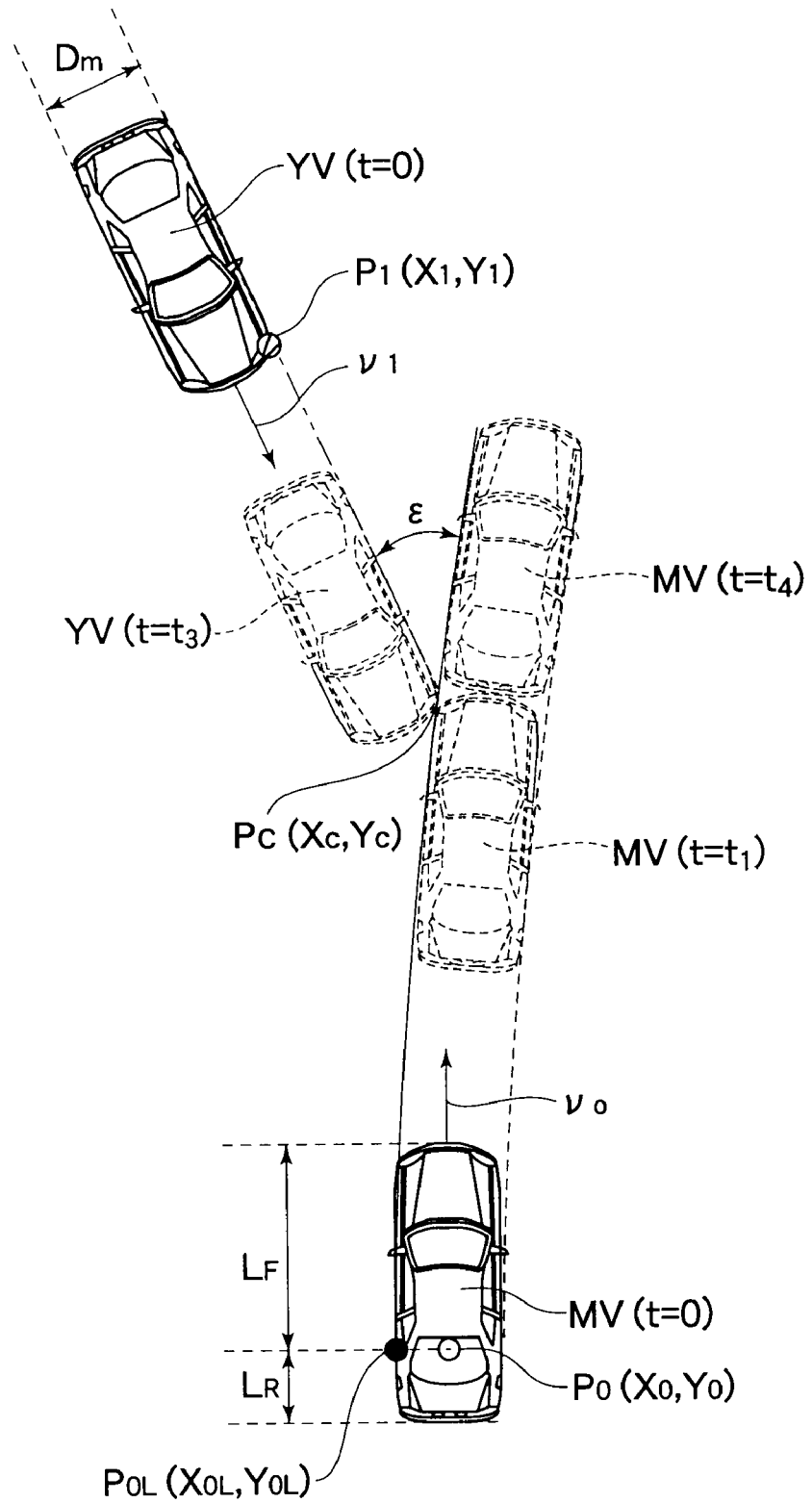
FIG. 7 is a plan view showing one example of a method of determining whether a collision will occur where the collision is "side-face oblique collision"

Side-face Oblique Collision FIG. 7 and FIGS. 8A-8C are views useful for explaining one example of a method of estimating a collision position, and other methods, in the case where the predicted collision is the "side-face oblique collision". FIG. 7 is a plan view showing one example of a method of determining whether a collision will occur where the collision concerned is the "side-face oblique collision".

Suppose the target vehicle YV approaches the own vehicle MV from the front, left-hand side of the own vehicle MV, as shown in FIG. 7. The own-vehicle trajectory calculating unit 11 determines the travel trajectory of the own vehicle MV in the form of an arc, and the target-vehicle trajectory calculating unit 12 determines the travel trajectory of the target vehicle YV in the form of a straight line. The radar device 21 detects the left end of the front face of the target vehicle YV as an acquisition point $P_1(X_1, Y_1)$. In this case, the collision position $P_C(X_C, Y_C)$ is defined as an intersection point of the trajectory of the acquisition point $P_1$ of the target vehicle YV and the trajectory of the point $P_{0L}(X_{0L}, Y_{0L})$ on the left side face of the own vehicle MV which lies on the rear axle that passes the rear-axle center $P_0(X_0, Y_0)$.

Time $t_1$ it takes for the front end of the own vehicle MV to reach the collision position $P_C$, time $t_4$ it takes for the rear end of the own vehicle MV to reach the collision position $P_C$, and time $t_3$ it takes for the front end (=the acquisition point $P_1$) of the target vehicle YV to reach the collision position $P_C$ are obtained according to the following equations (20), (21), (22). Although the following equation (20) is identical with the above-indicated equation (14), and the following equation (22) is identical with the above-indicated equation (16), new equation numbers are assigned to these equations, which will be presented again for the sake of convenience.

$$t_1 = (((X_{0L} - X_C)^2 + (Y_{0L} - Y_C)^2)^{1/2} - L_F)/v_0 \tag{20}$$

$$t_4 = (((X_{0L} - X_C)^2 + (Y_{0L} - Y_C)^2)^{1/2} + L_R)/v_0 \tag{21}$$

$$t_3 = ((X_1 - X_C)^2 + (Y_1 - Y_C)^2)^{1/2}/v_1 \tag{22}$$

In the above equations (20)-(22), $v_0$ represents the velocity of the own vehicle MV, and $v_1$ represents the velocity of the target vehicle YV. Also, $L_F$ represents the front-side vehicle length of the own vehicle MV, and $L_R$ represents the rear-side vehicle length of the own vehicle MV (see FIG. 3A).

A condition under which the collision face determining unit 13 determines that a collision will occur is represented by the following equation (23).

$$t_1 \leq t_3 \leq t_4 \tag{23}$$

Namely, when the collision face determining unit 13 determines that the above equation (23) is satisfied, it determines that the side face of the own vehicle MV is a potential collision face. Then, the collision position estimating unit 14 estimates the coordinates (CPx, CPy') of the collision position on the CP coordinate system (see FIG. 3A), using the above-indicated equations (18), (19). In the following, the equations (18), (19) will be presented again for the sake of convenience.

$$CPx = -D_L \tag{18}$$

$$CPy' = ((X_{0L} - X_C)^2 + (Y_{0L} - Y_C)^2)^{1/2} - v_0 \times t_3 - L_F \tag{19}$$

Figure 8A:
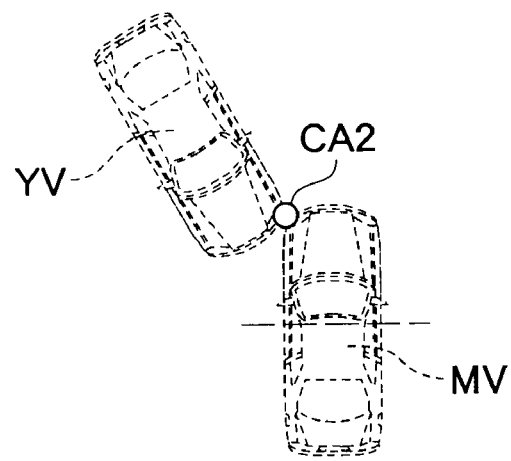
FIGS. 8A-8C are plan views showing one example of a method of calculating the collision position when the predicted collision is "side-face oblique collision"
Figure 8B:
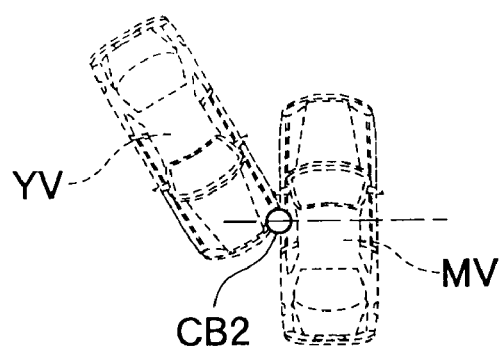
Figure 8C:
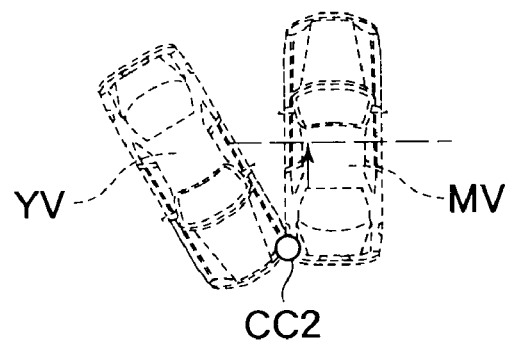

FIG. 8A-FIG. 8C are plan views each indicating one example of the result of calculation of the collision position obtained by the collision position estimating unit 14 in the case where the predicted collision is the "side-face oblique collision". As shown in FIGS. 8A-8C, when it is determined that the own-vehicle collision face is a side face and the collision angle ε is not a generally right angle (namely, when the predicted collision is the "side-face oblique collision"), one of the opposite ends of the front face of the target vehicle YV (e.g., the left end of the front face of the target vehicle YV in the examples of FIGS. 8A-8C) collides with the side face of the own vehicle MV. In this case (i.e., in the case where the predicted collision is the "side-face oblique collision"), it is not necessary to correct the estimated collision position. In this connection, it is determined that the predicted collision is the "side-face oblique collision" when the collision angle ε is smaller than 55 degrees or larger than 125 degrees (for example, when the collision angle ε is about 45 degrees).

Figure 9:
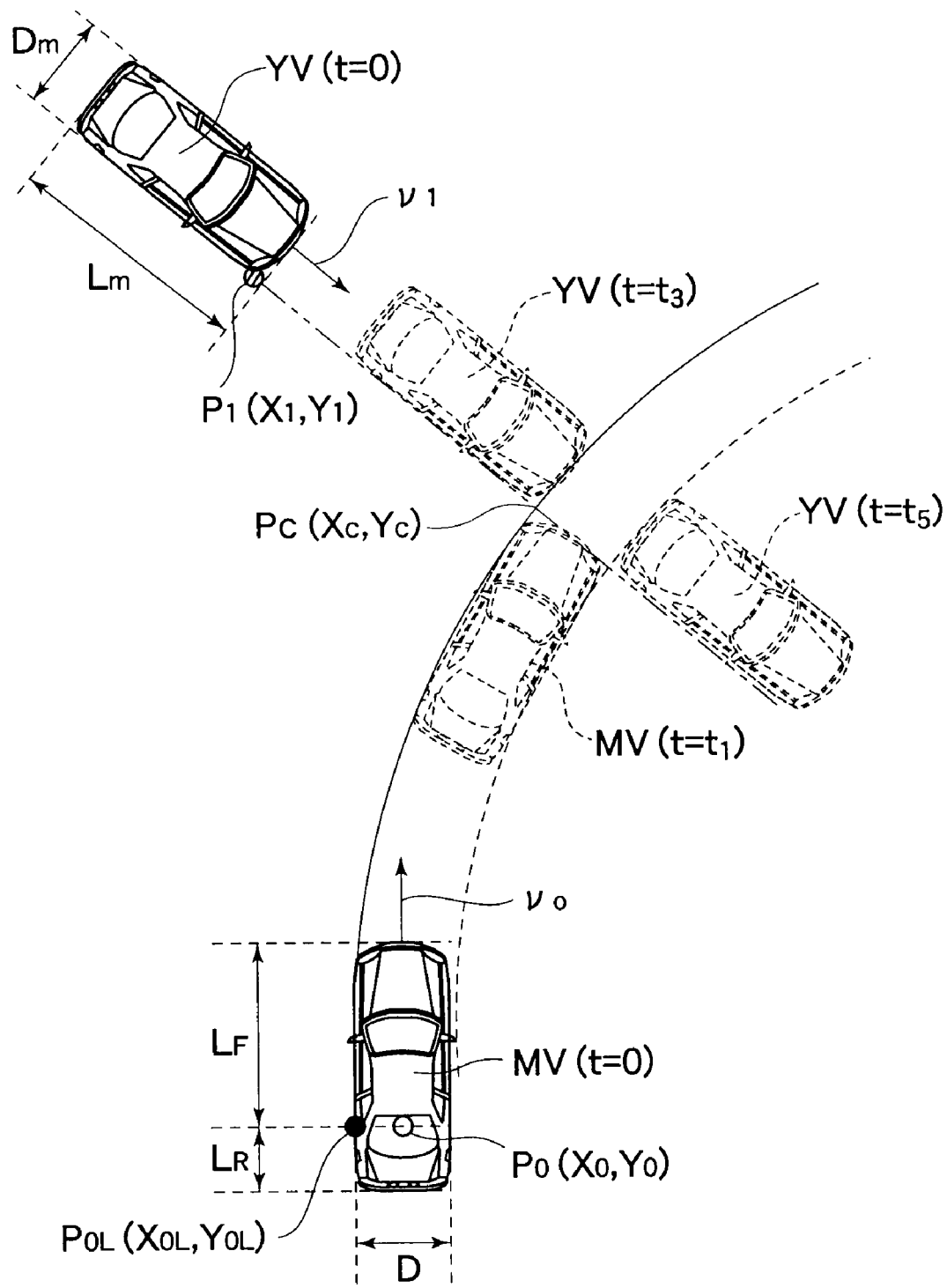
FIG. 9 is a plan view showing one example of a method of determining whether a collision will occur where the collision is "front-face right-angle collision"
Figure 10A:
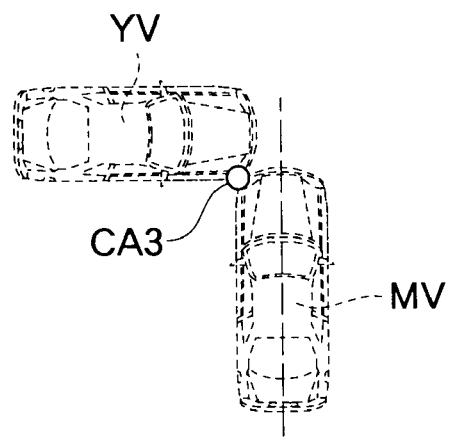
FIGS. 10A-10E are plan views showing one example of a method of correcting the collision position when the predicted collision is "front-face right-angle collision"
Figure 10B:
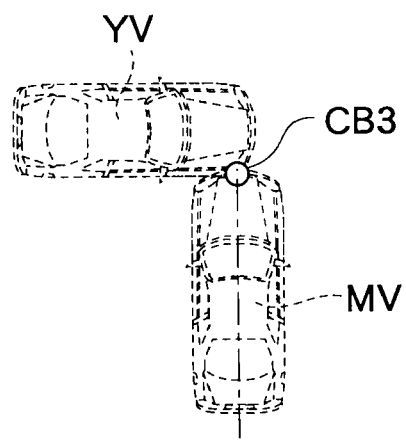
Figure 10C:
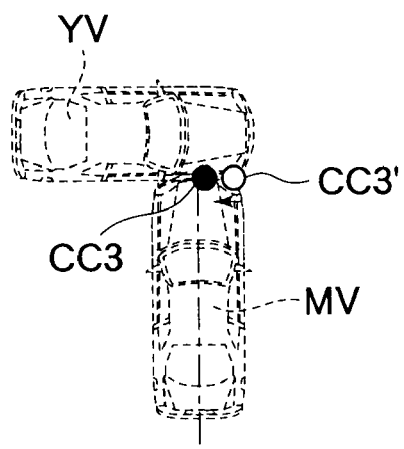
Figure 10D:
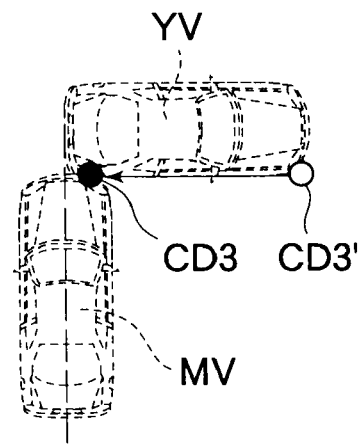
Figure 10E:
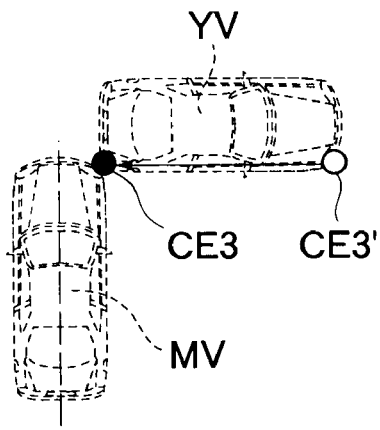
Figure 11:
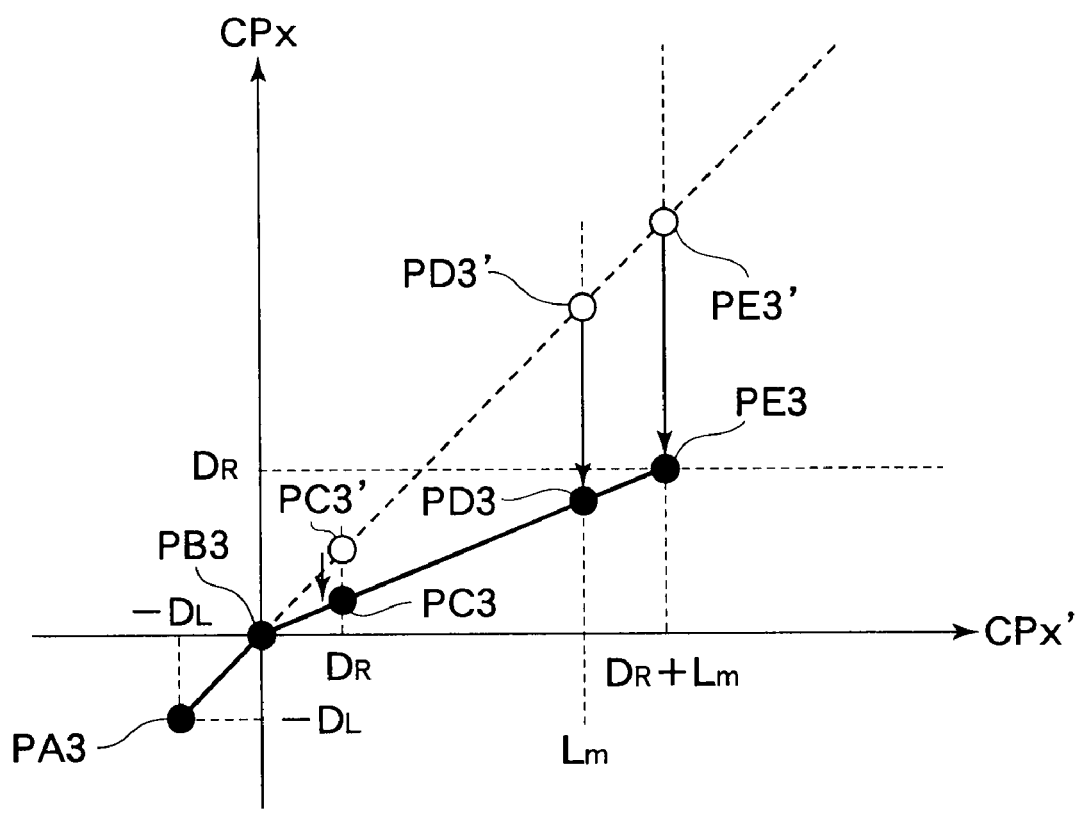
FIG. 11 is a graph showing one example of the method of correcting the collision position when the predicted collision is "front-face right-angle collision"

Front-face Right-angle Collision FIG. 9 through FIG. 11 are views useful for explaining one example of a method of estimating a collision position, and other methods, in the case where the predicted collision is the "front-face right-angle collision". FIG. 9 is a plan view showing one example of a method of determining whether a collision will occur when the collision concerned is the "front-face right-angle collision".

Suppose the target vehicle YV approaches the own vehicle MV from the front, left-hand side of the own vehicle MV, as shown in FIG. 9. The own-vehicle trajectory calculating unit 11 determines the travel trajectory of the own vehicle MV in the form of an arc, and the target-vehicle trajectory calculating unit 12 determines the travel trajectory of the target vehicle YV in the form of a straight line. The radar device 21 detects the right end of the front face of the target vehicle YV as an acquisition point $P_1(X_1, Y_1)$. In this case, the collision position $P_C(X_C, Y_C)$ is defined as an intersection point of the trajectory of the acquisition point $P_1$ of the target vehicle YV and the trajectory of the point $P_{0L}(X_{0L}, Y_{0L})$ on the left side face of the own vehicle MV which lies on the rear axle that passes the rear-axle center $P_0(X_0, Y_0)$.

Time $t_1$ it takes for the front end of the own vehicle MV to reach the collision position $P_C$, time $t_3$ it takes for the front end (=acquisition point $P_1$) of the target vehicle YV to reach the collision position $P_C$, and time $t_5$ it takes for the rear end of the target vehicle YV to reach a position ahead of the collision position $P_C$ by a distance equal to the vehicle width D of the own vehicle MV are obtained according to the following equations (24), (25), (26). Although the following equation (24) is identical with the above-indicated equation (14), and the following equation (25) is identical with the above-indicated equation (16), new equation numbers are assigned to these equations, which will be presented below again for the sake of convenience.

$$t_1 = (((X_{0L} - X_C)^2 + (Y_{0L} - Y_C)^2)^{1/2} - L_F)/v_0 \tag{24}$$

$$t_3 = ((X_1 - X_C)^2 + (Y_1 - Y_C)^2)^{1/2}/v_1 \tag{25}$$

$$t_5 = (((X_1 - X_C)^2 + (Y_1 - Y_C)^2)^{1/2} + L_m + D)/v_1 \tag{26}$$

In the above equations (24)-(26), $v_0$ represents the velocity of the own vehicle MV, and $v_1$ represents the velocity of the target vehicle YV. Also, $L_F$ represents the front-side vehicle length of the own vehicle MV, and $L_m$ represents the vehicle length of the target vehicle YV, while D represents the vehicle width of the own vehicle MV (see FIG. 3A).

A condition under which the collision face determining unit 13 determines that a collision will occur is represented by the following equation (27).

$$t_3 \leq t_1 \leq t_5 \tag{27}$$

Namely, when the collision face determining unit 13 determines that the above equation (27) is satisfied, it determines that the front face of the own vehicle MV is a potential collision face. Then, the collision position estimating unit 14 estimates the coordinates (CPx', CPy) of the collision position on the CP coordinate system (see FIG. 3A), using the following equations (28), (29).

$$CPx' = v_1 \times t_1 - ((X_1 - X_C)^2 + (Y_1 - Y_C)^2)^{1/2} - D_L \tag{28}$$

$$CPy = 0 \tag{29}$$

FIGS. 10A-10E are plan views showing one example of a method of correcting the collision position via the collision position correcting unit 16 in the case where the predicted collision is the "front-face right-angle collision". Each of the white circles ○ indicated in FIGS. 10A-10E represents one example of the collision position obtained by the collision position estimating unit 14 according to the above equations (28) and (29). Also, each of the black circles ● indicated in FIGS. 10C-10E represents one example of the collision position corrected by the collision position correcting unit 16 according to the above-indicated equations (5) through (8). In the following, the equations (5) through (8) will be presented again for the sake of convenience. Here, it is assumed that the collision angle ε is generally equal to the right angle (in this embodiment, the collision angle ε is equal to or larger than 55 degrees and equal to or smaller than 125 degrees).

$$CPx = CPx' - L_m \times \sigma 2 \tag{5}$$

$$\sigma 2 = 0 \text{ (where } CPx' < 0) \tag{6}$$

$$\sigma 2 = CPx'/(L_m + D/2) \text{ (where } 0 \leq CPx' < (L_m + D/2)) \tag{7}$$

$$\sigma 2 = 1 \text{ (where } L_m + D/2 \leq CPx') \tag{8}$$

As indicated in the above equations (5) through (8), when it is determined that the own-vehicle collision face is the front face of the own vehicle MV, and the collision angle ε is generally equal to the right angle (namely, when the predicted collision is the "front-face right-angle collision"), the estimated collision position is corrected based on the vehicle length $L_m$ of the target vehicle YV, so that the collision position can be determined with high accuracy. More specifically, when the target vehicle YV collides at a generally right angle with the front face of the own vehicle MV, a certain area of the side face of the target vehicle YV is brought into collision with a certain area of (i.e., a part of or the entire area of) the front face of the own vehicle MV (see FIG. 9 and FIGS. 10A-10E). Therefore, the collision position can be accurately determined by making a correction in view of the vehicle length $L_m$ of the target vehicle YV.

As shown in FIGS. 10A-10E, the collision position correcting unit 16 corrects the collision position estimated by the collision position estimating unit 14 by shifting it to a position which is included in a range or area over which the side face of the target vehicle YV collides with the front face of the own vehicle MV at the estimated collision time and which is closer to a widthwise central position (indicated by a one-dot chain line in the figures) of the own vehicle MV. In the case as shown in FIG. 10E (where a rear end portion of the side face of the target vehicle YV collides with the right end of the front face of the own vehicle MV), for example, the position CE3' of the white circle ○ indicating the collision position that has not been corrected is located at a position spaced apart from the own vehicle MV, whereas the position CE3 of the black circle ● indicating the collision position that has been corrected is appropriately located at the right-end position of the front face of the own vehicle MV.

FIG. 11 is a graph indicating one example of the method of correcting the collision position via the collision position correcting unit 16 in the case where the predicted collision is the "front-face right-angle collision". In FIG. 11, the horizontal axis indicates the CPx' coordinate of the collision position that has not been corrected, and the vertical axis indicates the CPx coordinate of the collision position that has been corrected. Points PA3, PB3, PC3'-PE3' shown in FIG. 11 correspond to the positions CA3, CB3, CC3'-CE3' of the white circles ○ indicating the collision positions that have not been corrected in FIG. 10A-FIG. 10E. Also, points PC3-PE3 shown in FIG. 11 correspond to the positions CC3-CE3 of the black circles ● indicating the collision positions that have been corrected in FIG. 10C-FIG. 10E.

For example, point PD3' (CPx'=$L_m$) indicating the collision position that has not been corrected in FIG. 10D is corrected to point PD3 (CPx=$D_R \times L_m/(D_R+L_m)$) indicating the corrected collision position, as shown in FIG. 11. Also, point PE3' (CPx'=$D_R+L_m$) indicating the collision position that has not been corrected in FIG. 10E is corrected to point PE3 (CPy=$D_R$) indicating the corrected collision position.

In the above manner, the collision position is appropriately corrected by the collision position correcting unit 16, so that the collision position can be further accurately determined. For example, when the target vehicle YV approaches the own vehicle MV from the front, left-hand side of the own vehicle MV, the right end of the front face of the target vehicle YV is detected by the radar device 21 (see FIG. 9); therefore, the position of collision between the right end of the front face of the target vehicle YV and the own vehicle MV is estimated. Also, when the target vehicle YV collides at a generally right angle with the front face of the own vehicle MV, a certain area of the side face of the target vehicle YV is brought into collision with a certain area of (i.e., a part of or the entire area of) the front face of the own vehicle MV (see FIG. 9 and FIGS. 10A-10E). Accordingly, the collision position is appropriately corrected when the collision position correcting unit 16 corrects the collision position to a position closer to the widthwise central position of the own vehicle MV.

While the collision position correcting unit 16 corrects the collision position according to the above-indicated equations (5)-(8) in this embodiment when the "front-face right-angle collision" is expected to occur, the collision position correcting unit 16 may correct the collision position by other methods. For example, the collision position may be corrected to a position on the side face of the target vehicle YV that collides with the front face of the own vehicle MV, which position is closest to the widthwise central position of the own vehicle MV. In this case, if a collision as shown in FIG. 10C is predicted, for example, the widthwise central position (indicated by the one-dot chain line in FIG. 10C) of the own vehicle MV is included in a range of the front face of the own vehicle MV with which the side face of the target vehicle YV collides, and therefore, the collision position is corrected to the widthwise central position of the own vehicle MV.

Figure 12:
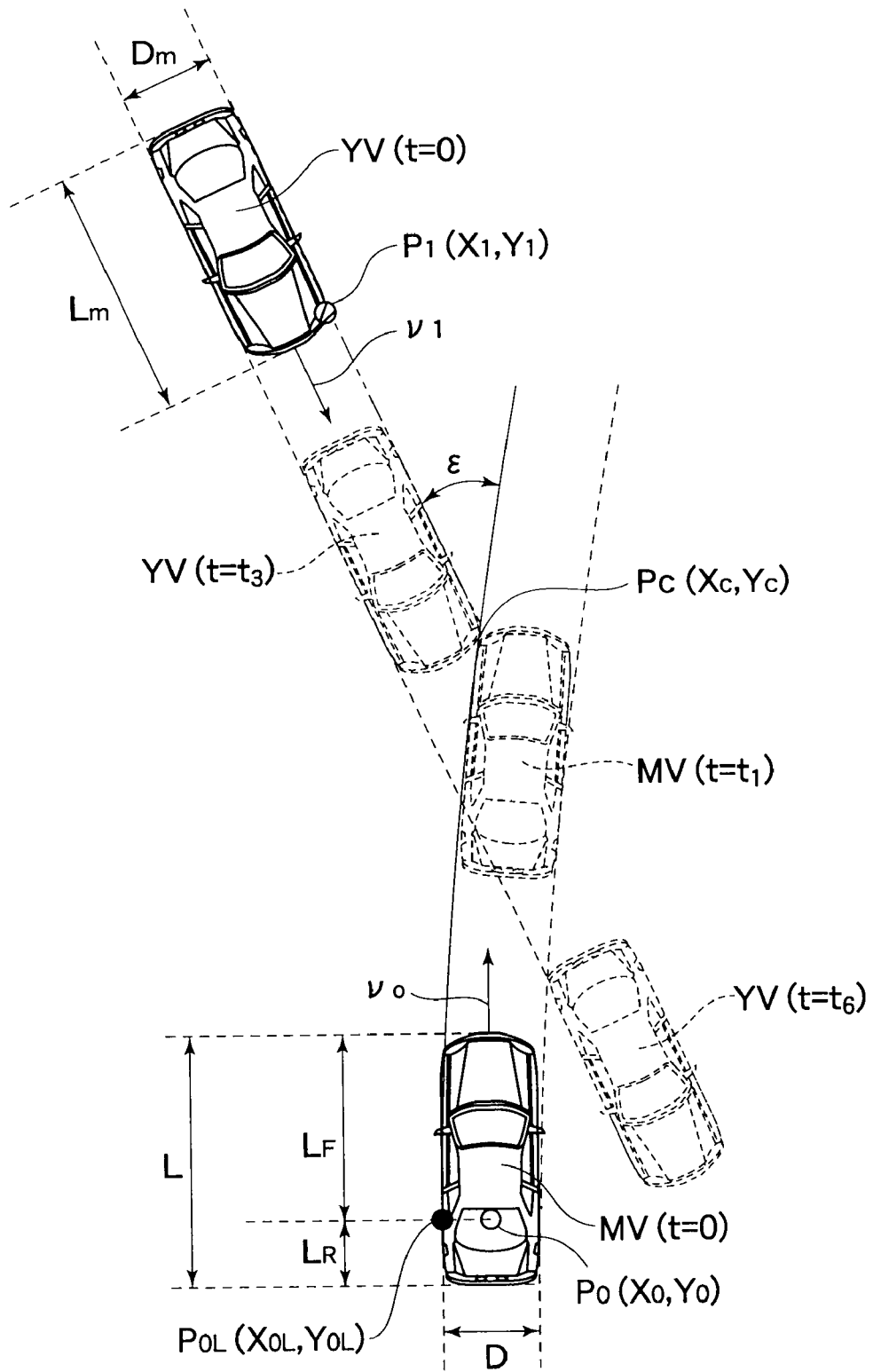
FIG. 12 is a plan view showing one example of a method of determining whether a collision will occur where the collision is "front-face oblique collision"

Front-face Oblique Collision FIG. 12, FIG. 13, FIG. 14, FIG. 15A-15E and FIGS. 16A-16B are views useful for explaining one example of a method of estimating a collision position, and other methods, in the case where the predicted collision is the "front-face oblique collision". FIG. 12 is a plan view showing one example of a method of determining whether a collision will occur where the collision concerned is the "front-face oblique collision".

Suppose the target vehicle YV approaches the own vehicle MV from the front, left-hand side of the own vehicle MV, as shown in FIG. 12. The own-vehicle trajectory calculating unit 11 determines the travel trajectory of the own vehicle MV in the form of an arc, and the target-vehicle trajectory calculating unit 12 determines the travel trajectory of the target vehicle YV in the form of a straight line. The radar device 21 detects the left end of the front face of the target vehicle YV as an acquisition point $P_1(X_1, Y_1)$. In this case, the collision position $P_C(X_C, Y_C)$ is defined as an intersection point of the trajectory of the acquisition point $P_1$ of the target vehicle YV and the trajectory of the point $P_{0L}(X_{0L}, Y_{0L})$ on the left side face of the own vehicle MV which lies on the rear axle that passes the rear-axle center $P_0(X_0, Y_0)$.

Figure 13:
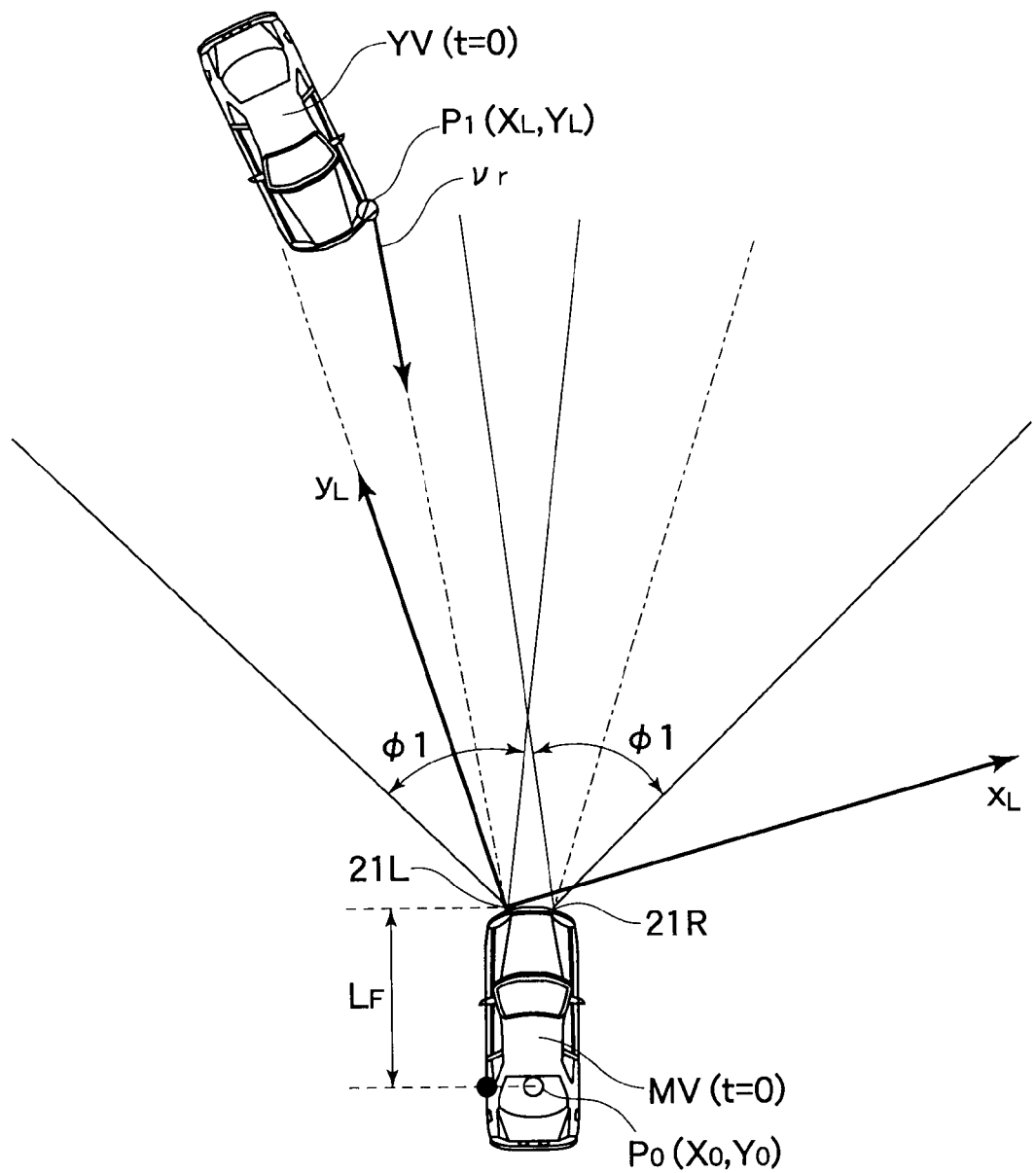
FIG. 13 is a plan view showing one example of a coordinate system, etc. for use in the determination as to whether a collision will occur where the collision is "front-face oblique collision"

FIG. 13 is a plan view showing one example of a radar coordinate system, or the like, used in the determination as to whether a collision will occur, in the case where the collision concerned is the "front-face oblique collision". As shown in FIG. 13, the radar device 21 includes two radar sensors 21R, 21L mounted in a front end portion of the own vehicle MV and arranged in the vehicle width direction. Each of the radar sensors 21R, 21L is able to detect an object in a region within a range of a preset divergence angle φ1 (e.g., 40°), such that the region covered by the radar sensor 21R extends to the right, frontward of the own vehicle MV, and the region covered by the radar sensor 21L extends to the left, frontward of the own vehicle MV. While two radar sensors 21R, 21L are installed on the own vehicle in this embodiment, only one radar sensor may be installed, or three or more radar sensors may be installed on the own vehicle.

In the example of FIG. 13, the acquisition point $P_1$ of the target vehicle YV and the relative velocity $v_r$ of the target vehicle YV are detected by the radar device 21 via the radar sensor 21L. Then, a radar coordinate system having the origin point at the mounting position of the radar sensor 21L is defined by the $Y_L$ axis set in a direction in which the center line of the divergence angle φ1 extends, and the $X_L$ axis set in a direction perpendicular to the $Y_L$ axis. Where the coordinates of the acquisition point $P_1$ on the radar coordinate system are denoted as $(X_L, Y_L)$, time $t_F$ it takes for the own vehicle MV to collide with the other vehicle YV is given by the following equation (30).

$$t_F = (X_L^2 + Y_L^2)^{1/2}/v_r \tag{30}$$

Referring back to FIG. 12, time $t_3$ it takes for the front end (=the acquisition point $P_1$) of the target vehicle YV to reach the collision position $P_C$, and time $t_6$ it takes for the rear end of the target vehicle YV to reach a position (position of the target vehicle YV denoted by YV (t=$t_6$) in FIG. 12) ahead of the collision position $P_C$ by a distance corresponding to the vehicle width D of the own vehicle MV are obtained according to the following equations (31), (32), (32'). Although the following equation (31) is identical with the above-indicated equation (16), a new equation number (31) is assigned to this equation, which will be presented below again for the sake of convenience.

$$t_3 = ((X_1 - X_C)^2 + (Y_1 - Y_C)^2)^{1/2}/v_1 \tag{31}$$

$$t_6 = (((X_1 - X_C)^2 + (Y_1 - Y_C)^2)^{1/2} + L_m + (D + D_m)/\sin \epsilon)/v_1 \tag{32}$$

Where $\epsilon = 0$, $$t_6 = (((X_1 - X_C)^2 + (Y_1 - Y_C)^2)^{1/2} L_m + L)/v_1 \tag{32'}$$

In the above equations (31), (32), (32'), $v_1$ represents the velocity of the target vehicle YV, and L represents the vehicle length of the own vehicle MV. Also, D represents the vehicle width of the own vehicle MV, and $L_m$ represents the vehicle length of the target vehicle YV, while $D_m$ represents the vehicle width of the target vehicle YV (see FIG. 3A).

A condition under which the collision face determining unit 13 determines that a collision will occur is represented by the following equation (33).

$$t_3 \leq t_F \leq t_6 \tag{33}$$

Namely, when the collision face determining unit 13 determines that the above equation (33) is satisfied, it determines that the front face of the own vehicle MV is a potential collision face.

Next, a method by which the collision position estimating unit 14 estimates the coordinates (CPx', CPy) of the collision position on the CP coordinate system (see FIG. 3A) will be described. Initially, the position ($\theta_F$, $X_F$, $Y_F$) of the rear-axle center of the own vehicle MV reached upon a lapse of time $t_F$ obtained according to the above equation (30) is determined according to the following equations (34)-(36).

$$\theta_F = \theta_0 + v_0 \times t_F/(-R) \tag{34}$$

$$X_F = X_0 + v_0 \times t_F \times \sin(-\theta_F) \tag{35}$$

$$Y_F = Y_0 + v_0 \times t_F \times \cos(-\theta_F) \tag{36}$$

Figure 14:
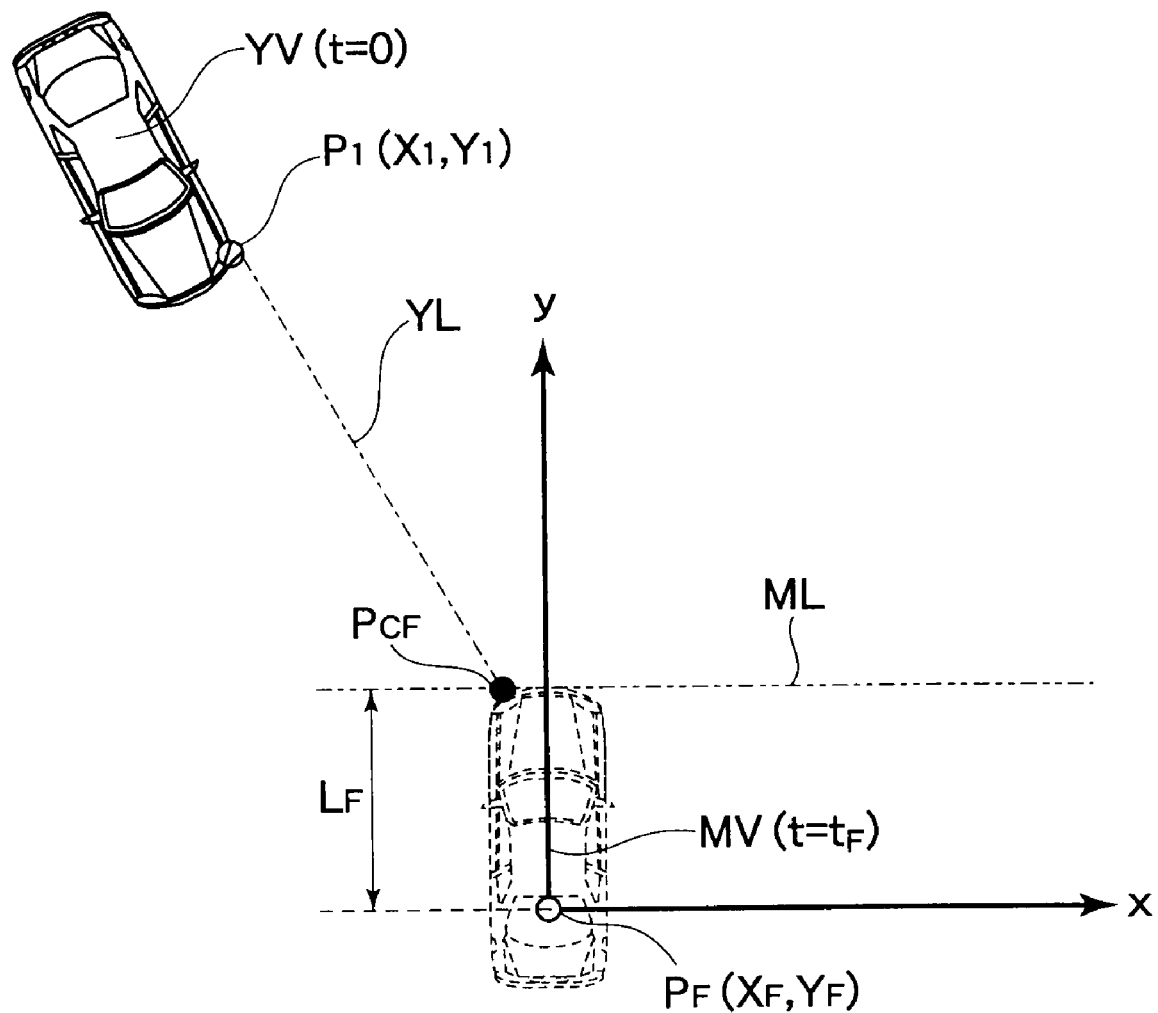
FIG. 14 is a plan view showing one example of a rear-axle center coordinate system, etc. for use in estimation of the collision position when the predicted collision is "front-face oblique collision"

FIG. 14 is a plan view showing one example of a coordinate system having the origin point at the center of the rear axle of the own vehicle MV, for use in estimation of the collision position, in the case where the predicted collision is the "front-face oblique collision". As shown in FIG. 14, the rear-axle-center coordinate system is a coordinate system having the origin point at the center of the rear axle of the own vehicle MV, in which the y axis is set to extend frontward of the own vehicle V, and the x axis is set to extend rightward of the own vehicle MV. In the rear-axle-center coordinate system of FIG. 14, an extension line ML that is drawn along the front face of the own vehicle MV in a condition where the own vehicle MV reaches the collision position (=position reached upon a lapse of time $t_F$) is represented by the following equation (37).

$$y = L_F \tag{37}$$

The above-indicated equation (37) is then converted into the following equation (38) as an equation of a coordinate system fixed on the ground.

$$p_F \times X + q_F \times Y + r_F = 0 \tag{38}$$

where coefficients $p_F$, $q_F$, $r_F$ are expressed using the position ($\theta_F$, $X_F$, $Y_F$) of the rear-axle center of the own vehicle MV reached upon the lapse of time $t_F$. Then, the coordinates ($X_{CF}$, $Y_{CF}$) of an intersection point $P_{CF}$ of the extension line ML defined by the above-indicated equation (38) and the predicted line YL of the trajectory of the target vehicle YV defined by the following equation (39) are obtained.

$$p_n \times X + q_n \times Y + r_n = 0 \tag{39}$$

If the following equation (40) is satisfied, the extension line ML and the predicted trajectory line YL extend in parallel with each other, and it is thus determined that there is no intersection point, which means that no collision will occur.

$$p_F \times q_n - p_n \times q_F = 0 \tag{40}$$

If the above equation (40) is not satisfied, the collision position estimating unit 14 estimates the coordinates (CPx', CPy) of the collision position on the CP coordinate system (see FIG. 3A), according to the following equations (41), (42).

$$CPx' = \cos(-\theta_F) \times (X_{CF} - X_F) - \sin(-\theta_F)(X_{CF} - X_F) \tag{41}$$

$$CPy = 0 \tag{42}$$

Figure 15A:
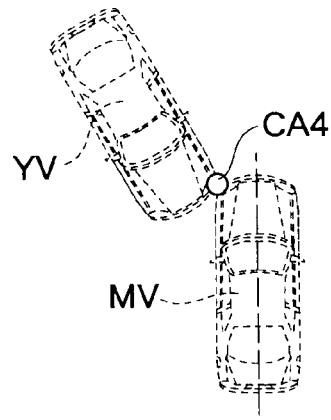
FIGS. 15A-15E are plan views showing one example of a method of correcting the collision position when the predicted collision is "front-face oblique collision"
Figure 15B:
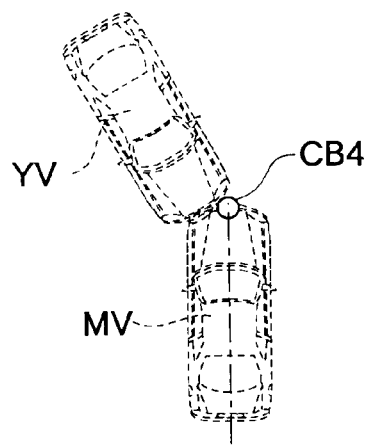
Figure 15C:
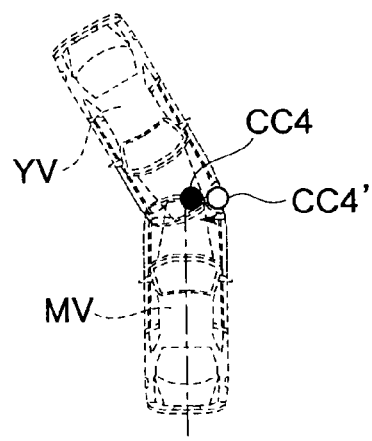
Figure 15D:
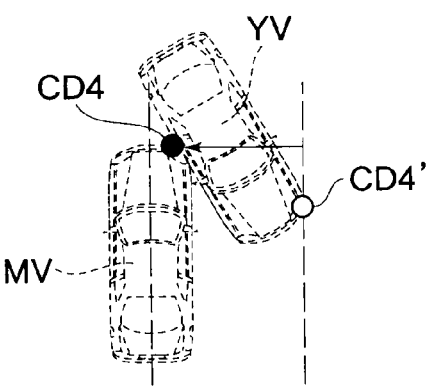
Figure 15E:
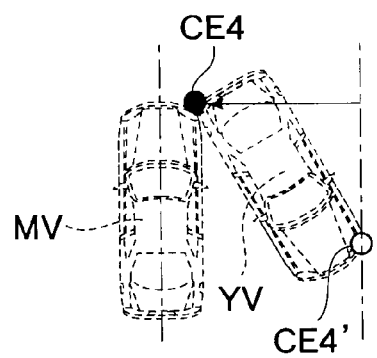

FIGS. 15A-15E are plan views showing one example of the method of correcting the collision position via the collision position correcting unit 16 in the case where the predicted collision is the "front-face oblique collision". Each of the white circles ○ indicated in FIGS. 15A-15E represents one example of the collision position obtained by the collision position estimating unit 14 according to the above equations (41) and (42). Also, each of the black circles ● indicated in FIGS. 15C-15E represents one example of the collision position corrected by the collision position correcting unit 16 according to the above-indicated equations (9)-(13). In the following, the equations (9)-(13) are presented again for the sake of convenience. Here, the collision angle $\epsilon$ is a narrow angle (in this embodiment, the collision angle $\epsilon$ is equal to or larger than −75 degrees and equal to or smaller than 75 degrees.

$$CPx = CPx' - D_m \epsilon \times \sigma 3 \tag{9}$$

$$D_m \epsilon = L_m \times |\sin \epsilon| + D_m \times |\cos \epsilon| \tag{10}$$

$$\sigma 3 = 0 \text{ (where } CPx' < 0) \tag{11}$$

$$\sigma 3 = CPx'/(D_m \epsilon + D/2) \text{ (where } 0 \leq CPx' < (D_m \epsilon + D/2)) \tag{12}$$

$$\sigma 3 = 1 \text{ (where } D_m \epsilon + D/2 \leq CPx') \tag{13}$$

As indicated in the above equations (9)-(13), when it is determined that the own-vehicle collision face is the front face of the own vehicle MV and the collision angle $\epsilon$ is a narrow angle (namely, when the predicted collision is the "front-face oblique collision"), the estimated collision position is corrected based on the vehicle length $L_m$ and vehicle width $D_m$ of the target vehicle YV, and therefore, the collision position can be determined with high accuracy. More specifically, when the target vehicle YV collides at a narrow angle with the front face of the own vehicle MV, a certain area or point of the front face or side face of the target vehicle YV is brought into collision with a certain area or point of the front face of the own vehicle MV (see FIG. 14 and FIGS. 15A-15E). Therefore, the collision position can be accurately determined by making a correction in view of the vehicle length $L_m$ and vehicle width $D_m$ of the target vehicle YV.

As shown in FIG. 15A-FIG. 15E, the collision position correcting unit 16 corrects the collision position estimated by the collision position estimating unit 14 by shifting it to a position which is included in a range or area over which the front face (or side face) of the target vehicle YV collides with the front face of the own vehicle MV at the estimated collision time and which is closer to a widthwise central position (indicated by a one-dot chain line in the figures) of the own vehicle MV. In the case as shown in FIG. 15E (where the rear end of the target vehicle YV collides with the right end of the front face of the own vehicle MV), for example, the position CE4' of the white circle ○ indicating the collision position that has not been corrected is located at a front-end position of the target vehicle YV which is spaced apart from the own vehicle MV, whereas the position CE4 of the black circle ● indicating the collision position that has been corrected is appropriately located at a front-end position of the own vehicle MV.

Figure 16A:
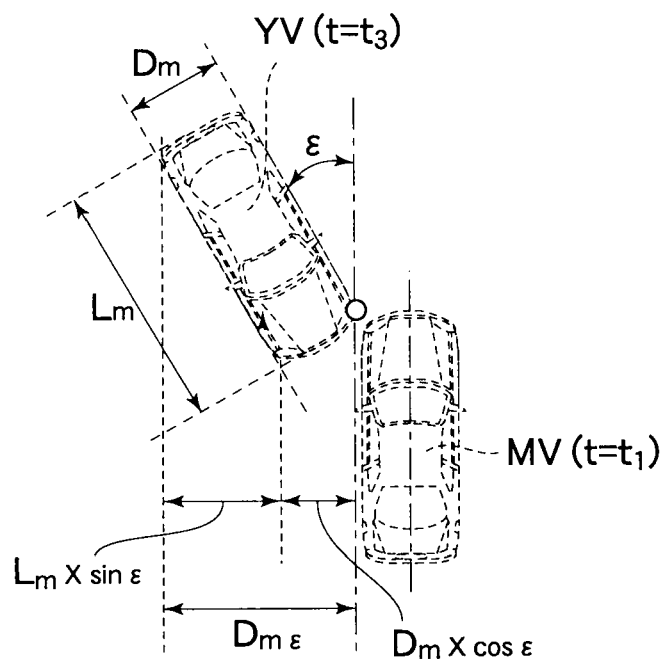
FIGS. 16A-16B are explanatory views showing one example of the method of correcting the collision position when the predicted collision is "front-face oblique collision"
Figure 16B:
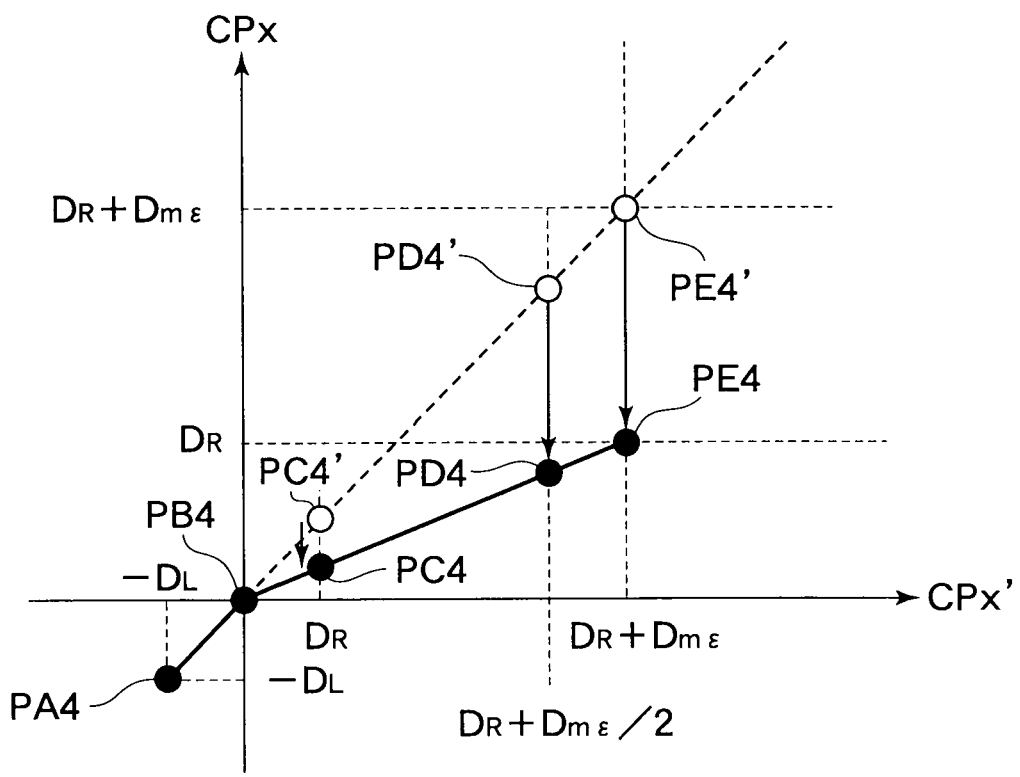

FIG. 16A is a plan view indicating the distance $D_m\epsilon$ defined by the above-indicated equation (10). FIG. 16B is a graph showing one example of the method of correcting the collision position via the collision position correcting unit 16 in the case where the predicted collision is the "front-face oblique collision". As shown in FIG. 16A, the distance $D_m\epsilon$ is equivalent to the length of the target vehicle YV projected on the ground in the width direction of the own vehicle MV at the time of collision.

In FIG. 16B, the horizontal axis indicates the CPx' coordinate of the collision position that has not been corrected, and the vertical axis indicates the CPx coordinate of the collision position that has been corrected. Points PA4, PB4, PC4'-PE4' shown in FIG. 16B respectively correspond to the positions CA4, CB4, CC4'-CE4' of the white circles ○ indicating the collision positions that have not been corrected in FIGS. 15A-15E. Also, points PC4-PE4 shown in FIG. 16B respectively correspond to the positions CC4-CE4 of the black circles ● indicating the collision positions that have been corrected in FIGS. 15C-15E.

For example, point PD4' (CPx'=$D_R$+$D_m\epsilon$/2) indicating the collision position that has not been corrected in the example of FIG. 15D is corrected to point PD4 (CPx=$D_R\times(D_R+D_m\epsilon/2)/(D_R+D_m\epsilon)$) indicating the corrected collision position, as shown in FIG. 16B. Also, point PE4' (CPx'=$D_R$+$D_m\epsilon$) indicating the collision position that has not been corrected in the example of FIG. 15E is corrected to point PE4 (CPx=$D_R$) indicating the corrected collision position, as shown in FIG. 16B.

In the above manner, the collision position is appropriately corrected by the collision position correcting unit 16, so that the collision position can be further accurately determined. For example, when the target vehicle YV approaches the own vehicle MV from the front, left side of the own vehicle MV, the left end of the front face of the target vehicle YV is detected by the radar device 21 (see FIG. 12); therefore, the position of collision between the left end of the front face of the target vehicle YV and the own vehicle MV is estimated. Also, when the target vehicle YV collides at a narrow angle with the front face of the own vehicle MV (i.e., when the predicted collision is the "front-face oblique collision"), a certain area (or point) of the front face of the target vehicle YV is brought into collision with a certain area (or point) of the front face of the own vehicle MV (see FIG. 12 and FIGS. 15A-15E). Accordingly, the collision position correcting unit 16 is able to appropriately correct the estimated collision position by shifting it to a position closer to the widthwise central position of the own vehicle MV.

While the collision position correcting unit 16 corrects the collision position according to the above-indicated equations (9)-(13) in this embodiment when the "front-face oblique collision" is expected to occur, the collision position correcting unit 16 may correct the collision position by other methods. For example, the collision position may be corrected to a position on the front face (or side face) of the target vehicle YV that collides with the front face of the own vehicle MV, which position is closest to the widthwise central position of the own vehicle MV. In this case, if a collision as shown in FIG. 15C is predicted, for example, the widthwise central position (indicated by the one-dot chain line in FIG. 15C) of the own vehicle MV is included in a range of the front face of the own vehicle MV with which the front face of the target vehicle YV collides, and therefore, the collision position is corrected to the widthwise central position of the own vehicle MV.

Figure 17:
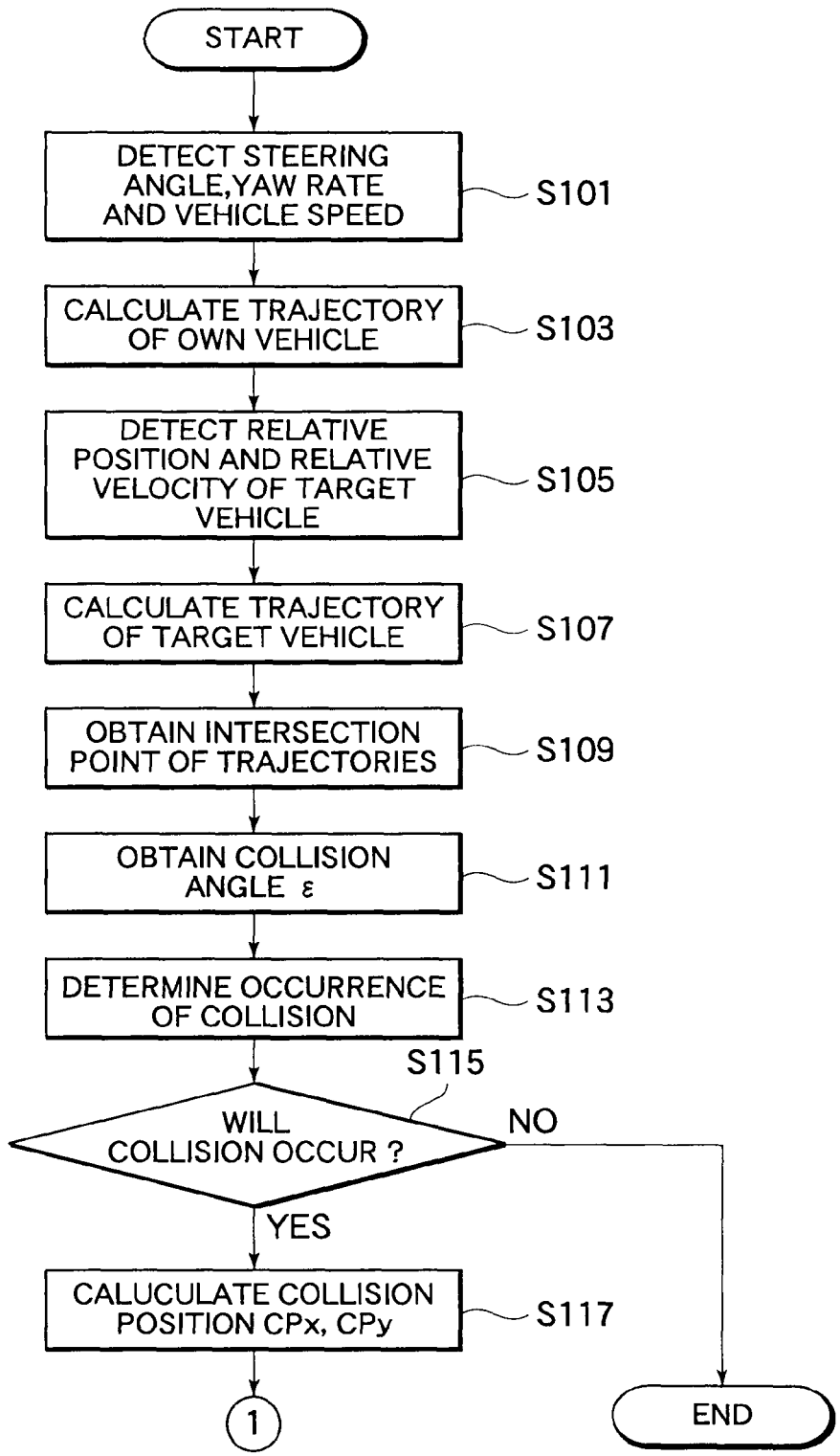
FIG. 17 is a first part of a flowchart illustrating one example of the operation of the collision prediction ECU.
Figure 18:
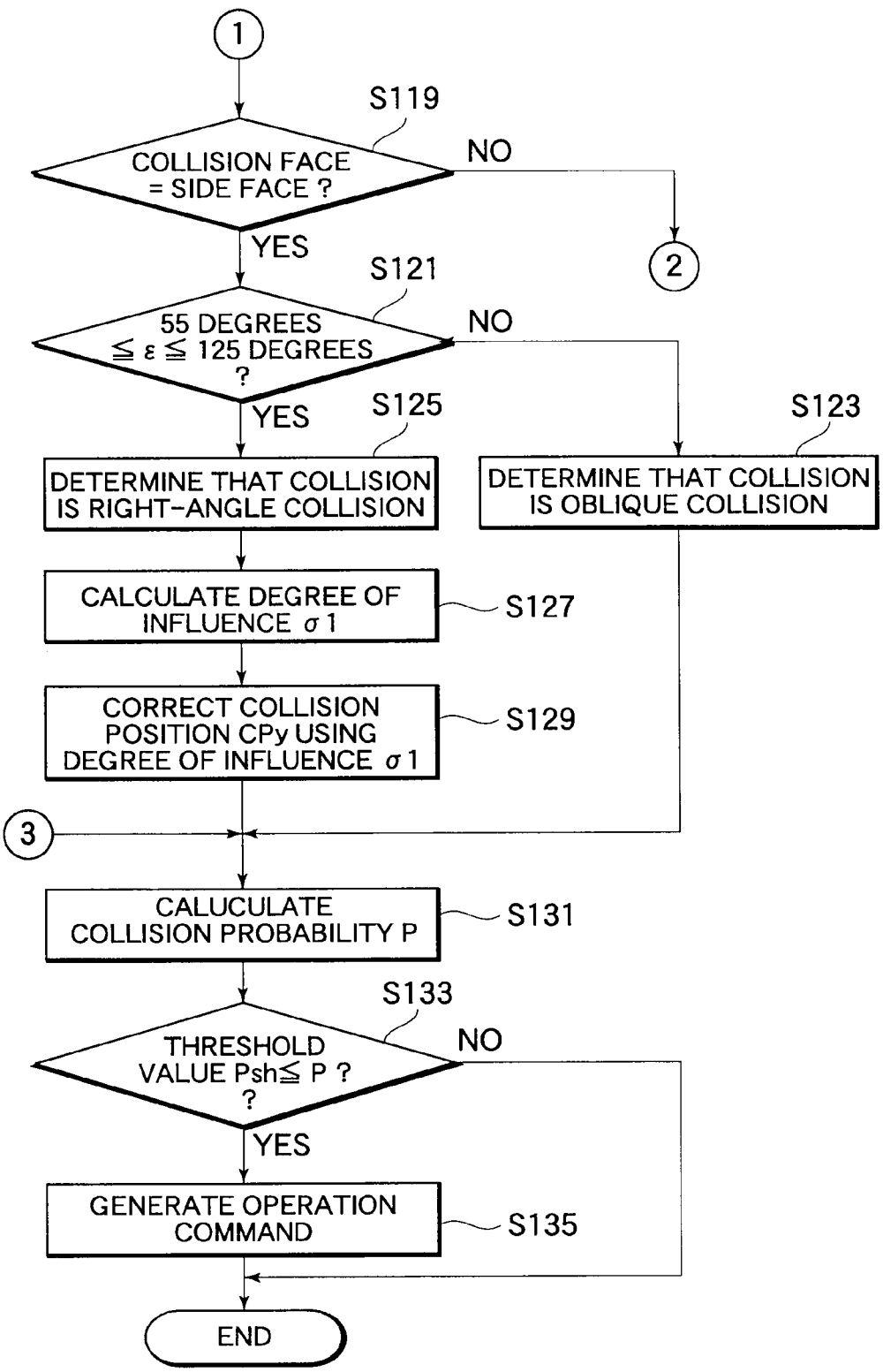
FIG. 18 is a second part of the flowchart illustrating one example of the operation of the collision prediction ECU.
Figure 19:
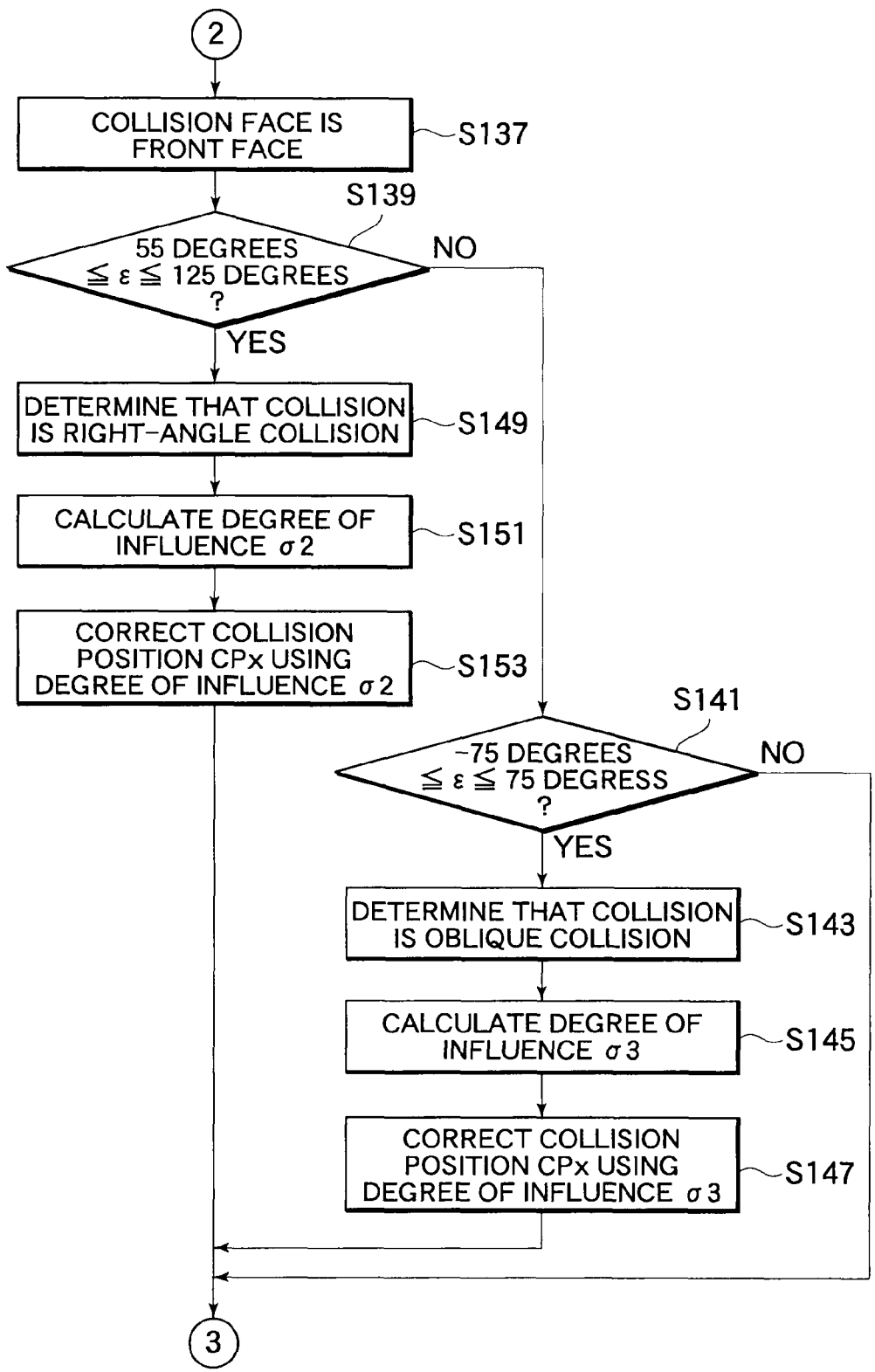
FIG. 19 is a third part of the flowchart illustrating one example of the operation of the collision prediction ECU.

FIG. 17 through FIG. 19 show a flowchart illustrating one example of the operation of the collision prediction ECU 1. Initially, the own-vehicle trajectory calculating unit 11 receives information indicative of the steering angle, yaw rate, and the vehicle speed from the steering angle sensor 22, yaw rate sensor 23 and the vehicle speed sensor 24, respectively, as shown in FIG. 17 (S101). Then, the own-vehicle trajectory calculating unit 11 determines the travel trajectory of the own vehicle MV (S103), based on the information indicative of the steering angle, yaw rate and the vehicle speed detected in step S101. Subsequently, the target-vehicle trajectory calculating unit 12 receives information, such as the relative position and relative velocity of the target vehicle YV, from the radar device (S105). Then, the target-vehicle trajectory calculating unit 12 determines the travel trajectory of the target vehicle YV (S107), based on the information, such as the relative position and relative velocity of the target vehicle YV detected in step S105.

Subsequently, the coordinates ($X_C$, $Y_C$) of the intersection point $P_C$ of the travel trajectory of the own vehicle MV obtained in step S103 and the travel trajectory of the target vehicle YV obtained in step S107 are obtained (S109). Then, the collision face determining unit 13 determines the collision angle $\epsilon$ (S111). Then, the collision face determining unit 13 determines whether a collision will occur, using, for example, the above-indicated equations (17), (23), (27), (33) (S113). If it is determined that no collision will occur (i.e., if NO is obtained in step S115), the control process ends. If it is determined that a collision will occur (i.e., if YES is obtained in step S115), the collision position estimating unit 14 estimates the coordinates of the collision position, according to the above-indicated equations (18) and (19) (or the equations (28) and (29) or (41) and (42)) (S117).

Subsequently, the collision face determining unit 13 determines whether the potential collision face is a side face of the own vehicle MV (S119). If it is determined that the collision face is not a side face of the own vehicle MV (i.e., if NO is obtained in step S119), the control proceeds to step S137 shown in FIG. 19. If it is determined that the collision face is a side face of the own vehicle MV (i.e., if YES is obtained in step S119), the collision angle determining unit 15 determines whether the collision angle $\epsilon$ obtained in step S111 of FIG. 17 is equal to or larger than 55 degrees and equal to or smaller than 125 degrees (S121). If it is determined that the collision angle $\epsilon$ is smaller than 55 degrees or larger than 125 degrees (i.e., if NO is obtained in step S121), the collision angle determining unit 15 determines that the predicted collision is an oblique collision (S123), and the control proceeds to step S131.

If it is determined that the collision angle $\epsilon$ is equal to or larger than 55 degrees and equal to or smaller than 125 degrees (i.e., if YES is obtained in step S121), the collision angle determining unit 15 determines that the predicted collision is a right-angle collision (S125). Then, the collision position correcting unit 16 obtains the degree of influence σ1 according to the above-indicated equations (2)-(4) (S127). Then, the collision position correcting unit 16 corrects the collision position obtained in step S117 shown in FIG. 17 according to the above-indicated equation (1), using the degree of influence σ1 obtained in step S127 (S129).

In the case where step S123 has been executed, or step S129 has been executed, or NO is obtained in step S141 shown in FIG. 19, or step S147 shown in FIG. 19 has been executed, or step S153 shown in FIG. 19 has been executed, the probability determining unit 17 obtains the collision probability P (S131). Then, the probability determining unit 17 determines whether the collision probability P obtained in step S131 is equal to or greater than a preset threshold value Psh (S133). If it is determined that the collision probability P is smaller than the threshold value Psh (i.e., if NO is obtained in step S133), the control process ends. If it is determined that the collision probability P is equal to or greater than the threshold value Psh (i.e., if YES is obtained in step S133), the operation directing unit 18 generates command information to one or more occupant protection devices, or the like, for activating the occupant protection device(s) (S135), and the control process ends.

If NO is obtained in step S119, the collision face determining unit 13 determines that the collision face is the front face, as shown in FIG. 19 (S137). Then, the collision angle determining unit 15 determines whether the collision angle ε obtained in step S111 of FIG. 17 is equal to or larger than 55 degrees and is equal to or smaller than 125 degrees (S139). If it is determined that the collision angle ε is equal to or larger than 55 degrees and is equal to or smaller than 125 degrees (i.e., if YES is obtained in step S139), the control proceeds to step S149. If it is determined that the collision angle ε is smaller than 55 degrees or larger than 125 degrees (i.e., if NO is obtained in step S139), the collision angle determining unit 15 determines whether the collision angle ε obtained in step S111 of FIG. 17 is equal to or larger than −75 degrees and is equal to or smaller than 75 degrees (S141). If it is determined that the collision angle ε is smaller than −75 degrees or larger than 75 degrees (i.e., if NO is obtained in step S141), the control proceeds to step S131 shown in FIG. 18, and step S131 and subsequent steps are executed.

If it is determined that the collision angle ε is equal to or larger than −75 degrees and is equal to or smaller than 75 degrees (i.e., if YES is obtained in step S141), the collision angle determining unit 15 determines that the predicted collision is an oblique collision (S143). Then, the collision position correcting unit 16 obtains the degree of influence σ3, according to the above-indicated equations (11)-(13) (S145). Then, the collision position correcting unit 16 corrects the collision position obtained in step S117 shown in FIG. 17, according to the above-indicated equation (9), using the degree of influence σ3 obtained in step S145 (S147). Then, the control proceeds to step S131 shown in FIG. 18, and step S131 and subsequent steps are executed.

If YES is obtained in step S139, the collision angle determining unit 15 determines that the predicted collision is a right-angle collision (S149). Then, the collision position correcting unit 16 obtains the degree of influence σ2 according to the above-indicated equations (6)-(8) (S151). Then, the collision position correcting unit 16 corrects the collision position obtained in step S117 shown in FIG. 17, according to the above-indicated equation (5), using the degree of influence σ2 obtained in step S151 (S153). Then, the control proceeds to step S131 shown in FIG. 18, and step S131 and subsequent steps are executed.

The above-indicated step S119 shown in FIG. 18 and step S137 shown in FIG. 19 may be regarded as corresponding to "collision face determining step". Also, step S117 shown in FIG. 17 may be regarded as corresponding to "collision position estimating step". Further, steps S121-S129 shown in FIG. 18 and steps S139-S153 shown in FIG. 19 may be regarded as corresponding to "collision position correcting step".

In the manner as described above, the estimated collision position is corrected based on at least one of the preset vehicle length $L_m$ and vehicle width $D_m$ of the target vehicle YV; therefore, the collision position can be accurately determined. For example, when the target vehicle YV collides at a generally right angle with a side face of the own vehicle MV, a certain area of (i.e., a part of or the entire area of) the front face of the target vehicle YV is brought into collision with a certain area of the side face of the own vehicle MV (see FIG. 4 and FIGS. 5A-5E). Therefore, the collision position can be accurately determined by making a correction in view of the vehicle width $D_m$ of the target vehicle YV.

It is to be understood that the collision prediction system and collision predicting method according to the present invention are not limited to those of the above-described embodiment, but may take other forms as follows. (A) In the illustrated embodiment, the collision prediction ECU 1 includes the own-vehicle trajectory calculating unit 11, target-vehicle trajectory calculating unit 12, collision face determining unit 13, collision position estimating unit 14, collision angle determining unit 15, collision position correcting unit 16, probability determining unit 17 and the operation directing unit 18 as functional units. However, at least one of the functional units, i.e., the own-vehicle trajectory calculating unit 11, target-vehicle trajectory calculating unit 12, collision face determining unit 13, collision position estimating unit 14, collision angle determining unit 15, collision position correcting unit 16, probability determining unit 17 and the operation directing unit 18, may be implemented by hardware, such as an electric circuit.

(B) While an object with which the own vehicle MV is presumed to collide is another vehicle (called "target vehicle") YV in the illustrated embodiment, the object may be any other type of object. For example, the object may be a motorbike, a bicycle, a pedestrian, or the like. In this case, the collision position correcting unit 16 may correct the collision position, based on the size commensurate with the type (=motorbike, bicycle, pedestrian, etc.) of the object.

(C) While the collision position correcting unit 16 corrects the collision position when the own vehicle MV is expected to collide with the target vehicle YV coming from the front of the own vehicle MV in the illustrated embodiment, as specifically described above, the collision position correcting unit 16 may correct the collision position when the own vehicle MV is expected to collide with the target vehicle YV coming from one side of the own vehicle MV or from the rear of the own vehicle MV. In this case, the collision position may be corrected in a manner depending on the type of the collision.

The present invention may be applied to a collision prediction system installed on an own vehicle and operable to predict a collision of the own vehicle with an object detected via a radar device, and its collision predicting method. More particularly, the invention may be applied to the collision prediction system and collision predicting method for estimating a position of collision between the own vehicle and another vehicle as the object.

While the invention has been described with reference to example embodiments thereof, it is to be understood that the invention is not limited to the described embodiments or constructions. To the contrary, the invention is intended to cover various modifications and equivalent arrangements. In addition, while the various elements of the example embodiments are shown in various combinations and configurations, other combinations and configurations, including more, less or only a single element, are also within the scope of the invention.

What is claimed is:

1. A collision prediction system installed on an own vehicle for predicting a collision of the own vehicle with an object detected via a radar device, comprising:
   a collision face determining portion that determines a collision face of the own vehicle which is presumed to collide with the object, based on a travelling direction of the object relative to the own vehicle at an estimated collision time at which a collision is presumed to occur;
   a collision position estimating portion that estimates a collision position of the own vehicle as a position of a potential collision with the object, based on the collision face determined by the collision face determining portion; and
   a collision position correcting portion that corrects the collision position estimated by the collision position estimating portion, based on a preset size of the object.

2. The collision prediction system according to claim 1, wherein:
   the object is another vehicle;
   the collision face determining portion determines an own-vehicle collision face as the collision face of the own vehicle which is presumed to collide with said another vehicle; and
   the collision position estimating portion estimates the collision position of the own vehicle at which the own vehicle is presumed to collide with said another vehicle, based on the own-vehicle collision face determined by the collision face determining portion.

3. The collision prediction system according to claim 2, wherein the collision position correcting portion corrects the collision position estimated by the collision position estimating portion, based on at least one of a vehicle width and a vehicle length of said another vehicle.

4. The collision prediction system according to claim 3, further comprising
   a collision angle determining portion that determines whether a collision angle as an angle formed by a travelling direction of said another vehicle with respect to a travelling direction of the own vehicle at the estimated collision time is generally equal to the right angle when the collision face determining portion determines that the own-vehicle collision face is a side face of the own vehicle, wherein
   the collision position correcting portion corrects the collision position estimated by the collision position estimating portion only when the collision angle determining portion determines that the collision angle is generally equal to the right angle.

5. The collision prediction system according to claim 4, wherein the collision angle determining portion determines that the collision angle is generally equal to the right angle when the collision angle is equal to or larger than a preset lower-limit threshold value and is equal to or smaller than a preset upper-limit threshold value.

6. The collision prediction system according to claim 5, wherein the collision angle determining portion determines that the collision angle is generally equal to the right angle when the collision angle is equal to or larger than 55 degrees and is equal to or smaller than 125 degrees.

7. The collision prediction system according to claim 4, wherein the collision position correcting portion corrects the collision position estimated by the collision position estimating portion, based on the vehicle width of said another vehicle, when the collision face determining portion determines that the own-vehicle collision face is a side face of the own vehicle.

8. The collision prediction system according to claim 7, wherein:
   the collision position estimating portion estimates the collision position of the own vehicle as a position of a potential collision with a right end or a left end of a front face of said another vehicle; and
   the collision position correcting portion corrects the collision position estimated by the collision position estimating portion, to a position which is included in a range over which the front face of said another vehicle collides with the side face of the own vehicle at the estimated collision time and which is closer to a longitudinally central position of the own vehicle.

9. The collision prediction system according to claim 8, wherein the collision position correcting portion corrects the collision position $CPy'$ estimated by the collision position estimating portion, using the vehicle width $D_m$ of said another vehicle, according to the following equations (1)-(4), so as to obtain a corrected position $CPy$:

$$CPy = CPy' + D_m \times \sigma 1 \qquad (1)$$

$$\sigma 1 = 0 \text{ (where } -L/2 < CPy'\text{)} \qquad (2)$$

$$\sigma 1 = (-CPy' - L/2)/(L/2) \text{ (where } -L < CPy' \leq -L/2\text{)} \qquad (3)$$

$$\sigma 1 = 1 \text{ (where } CPy' \leq -L\text{)} \qquad (4)$$

where the collision position $CPy'$ and the corrected position $CPy$ lie on a coordinate that extends in a longitudinal direction of the own vehicle and is directed frontward, with an origin point located at a front end of the own vehicle, and where $L$ is the length of the own vehicle.

10. The collision prediction system according to claim 3, further comprising
    a collision angle determining portion that determines whether a collision angle as an angle formed by a travelling direction of said another vehicle with respect to a travelling direction of the own vehicle at the estimated collision time is generally equal to the right angle when the collision face determining portion determines that the own-vehicle collision face is a front face of the own vehicle, wherein
    the collision position correcting portion corrects the collision position estimated by the collision position estimating portion, based on the vehicle length of said another vehicle, when the collision angle determining portion determines that the collision angle is generally equal to the right angle.

11. The collision prediction system according to claim 10, wherein the collision angle determining portion determines that the collision angle is generally equal to the right angle when the collision angle is equal to or larger than a preset lower-limit threshold value and is equal to or smaller than a preset upper-limit threshold value.

12. The collision prediction system according to claim 11, wherein the collision angle determining portion determines that the collision angle is generally equal to the right angle when the collision angle is equal to or larger than 55 degrees and is equal to or smaller than 125 degrees.

13. The collision prediction system according to claim 10, wherein:
    the collision position estimating portion estimates the collision position of the own vehicle as a position of a potential collision with a right end or a left end of a front face of said another vehicle; and the collision position correcting portion corrects the collision position estimated by the collision position estimating portion, to a position which is included in a range over which a side face of said another vehicle collides with the front face of the own vehicle at the estimated collision time and which is closer to a widthwise central position of the own vehicle.

14. The collision prediction system according to claim 13, wherein the collision position correcting portion corrects the collision position CPx' estimated by the collision position estimating unit, using a vehicle width D of the own vehicle and the vehicle length $L_m$ of said another vehicle, according to the following equations (5)-(8), so as to obtain a corrected position CPx:

$$CPx=CPx'-L_m \times \sigma 2 \quad (5)$$

$$\sigma 2=0 \text{ (where } CPx'<0) \quad (6)$$

$$\sigma 2=CPx'/(L_m+D/2) \text{ (where } 0 \leq CPx'<L_m+D/2) \quad (7)$$

$$\sigma 2=1 \text{ (where } L_m+D/2 \leq CPx') \quad (8)$$

where the collision position CPx' and the corrected position CPx lie on a coordinate that extends in a width direction of the own vehicle and is directed in the travelling direction of said another vehicle, with an origin point located at a widthwise central position on the front face of the own vehicle.

15. The collision prediction system according to claim 3, further comprising a collision angle determining portion that determines whether a collision angle as an angle formed by a travelling direction of said another vehicle with respect to a travelling direction of the own vehicle at the estimated collision time is a narrow angle when the collision face determining portion determines that the own-vehicle collision face is a front face of the own vehicle, wherein the collision position correcting portion corrects the collision position estimated by the collision position estimating portion, based on the vehicle length and vehicle width of said another vehicle, when the collision angle determining portion determines that the collision angle is a narrow angle.

16. The collision prediction system according to claim 15, wherein the collision angle determining portion determines that the collision angle is a narrow angle when the collision angle is equal to or larger than a preset lower-limit threshold value and is equal to or smaller than a preset upper-limit threshold value.

17. The collision prediction system according to claim 16, wherein the collision angle determining portion determines that the collision angle is a narrow angle when the collision angle is equal to or larger than −75 degrees and is equal to or smaller than 75 degrees.

18. The collision prediction system according to claim 15, wherein:

the collision position estimating portion estimates the collision position of the own vehicle as a position of a potential collision with a right end or a left end of a front face of said another vehicle; and the collision position correcting portion corrects the collision position estimated by the collision position estimating portion, to a position which is included in a range over which the front face of said another vehicle collides with the front face of the own vehicle at the estimated collision time and which is closer to a widthwise central position of the own vehicle.

19. The collision prediction system according to claim 18, wherein the collision position correcting portion corrects the collision position CPx' estimated by the collision position estimating unit, using the collision angle ϵ, a vehicle width D of the own vehicle, and the vehicle length $L_m$ and vehicle width $D_m$ of said another vehicle, according to the following equations (9)-(13), so as to obtain a corrected position CPx:

$$CPx=CPx'-D_m \epsilon \times \sigma 3 \quad (9)$$

$$D_m \epsilon = L_m \times |\sin \epsilon| + D_m \times |\cos \epsilon| \quad (10)$$

$$\sigma 3=0 \text{ (where } CPx'<0) \quad (11)$$

$$\sigma 3=CPx'/(D_m \epsilon+D/2) \text{ (where } 0 \leq CPx'<D_m \epsilon+D/2) \quad (12)$$

$$\sigma 3=1 \text{ (where } D_m \epsilon+D/2 \leq CPx') \quad (13)$$

where the collision position CPx' and the corrected position CPx lie on a coordinate that extends in a width direction of the own vehicle and is directed in the travelling direction of said another vehicle, with an origin point located at a widthwise central position on the front face of the own vehicle.

20. A collision predicting method for predicting a collision of an own vehicle with an object detected via a radar device, comprising:

determining a collision face of the own vehicle which is presumed to collide with the object, based on a travelling direction of the object relative to the own vehicle at an estimated collision time at which a collision is presumed to occur;

estimating a collision position of the own vehicle as a position of a potential collision with the object, based on the collision face determined in the step of determining a collision face; and correcting the collision position estimated in the step of estimating a collision position, based on a preset size of the object.

* * * * *